US012489363B2

(12) United States Patent
Yamada

(10) Patent No.: US 12,489,363 B2
(45) Date of Patent: Dec. 2, 2025

(54) SWITCHING CONTROL CIRCUIT, CONTROL CIRCUIT, AND POWER SUPPLY CIRCUIT

(71) Applicant: FUJI ELECTRIC CO., LTD., Kawasaki (JP)

(72) Inventor: Ryuji Yamada, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 207 days.

(21) Appl. No.: 18/455,339

(22) Filed: Aug. 24, 2023

(65) Prior Publication Data

US 2024/0146184 A1 May 2, 2024

(30) Foreign Application Priority Data

Oct. 28, 2022 (JP) .................................. 2022-173140

(51) Int. Cl.
*H02M 1/42* (2007.01)
*H02M 1/00* (2006.01)
(Continued)

(52) U.S. Cl.
CPC ........ *H02M 1/4208* (2013.01); *H02M 1/0009* (2021.05); *H02M 1/088* (2013.01); *H02M 7/23* (2013.01)

(58) Field of Classification Search
CPC .... H02M 1/4208; H02M 1/42; H02M 1/4225; H02M 1/425; H02M 1/4258;
(Continued)

(56) References Cited

U.S. PATENT DOCUMENTS

2010/0097041 A1* 4/2010 Ayukawa ............ H02M 1/4225
323/272
2010/0097828 A1 4/2010 Chen
(Continued)

FOREIGN PATENT DOCUMENTS

JP 2010-016973 A 1/2010
JP 2010-119285 A 5/2010
(Continued)

OTHER PUBLICATIONS

"MH2501SC/MH2511SC Application Note Ver. 3.0", by Applied Technology Department, Electronic Device Division. Group, Shindengen Electric Manufacturing Co., Ltd., issued on Nov. 11, 2020, Figs. 8 and 9, waveform 2, pp. 9-10 and p. 20; with partial translation.

*Primary Examiner* — Nguyen Tran
(74) *Attorney, Agent, or Firm* — Rabin & Berdo, P.C.

(57) ABSTRACT

A switching control circuit for a power supply circuit including first and second inductors, and first and second transistors controlling first and second inductor currents flowing through the first and second inductors, respectively. The switching control circuit includes: a detection circuit detecting a switching period of the first transistor and a time difference between first and second timings, at which the first and second inductor currents respectively reach first and second predetermined values; an error output circuit outputting an error between a predetermined ratio and a ratio of the time difference to the switching period; and a driving signal output circuit configured to output a driving signal to turn on the second transistor, after the second inductor current reaches the second predetermined value, and to turn off the second transistor, in response to a second time period according to the first time period and the error having elapsed.

7 Claims, 27 Drawing Sheets

(51) Int. Cl.
*H02M 1/088* (2006.01)
*H02M 7/23* (2006.01)

(58) Field of Classification Search
CPC .... H02M 1/4266; H02M 7/23; H02M 7/2195; H02M 7/25
See application file for complete search history.

(56) References Cited

U.S. PATENT DOCUMENTS

| | | | |
|---|---|---|---|
| 2010/0214806 A1* | 8/2010 | Chang | H02M 1/4225 363/16 |
| 2011/0116292 A1* | 5/2011 | Tsai | H02M 7/003 363/126 |
| 2013/0015786 A1 | 1/2013 | Sakae et al. | |
| 2022/0069714 A1 | 3/2022 | Beltran et al. | |

FOREIGN PATENT DOCUMENTS

| | | |
|---|---|---|
| JP | 2011-229364 A | 11/2011 |
| JP | 2016-086463 A | 5/2016 |
| JP | 2022-041912 A | 3/2022 |
| WO | 2008/032768 A1 | 3/2008 |
| WO | 2011/122172 A1 | 10/2011 |

\* cited by examiner

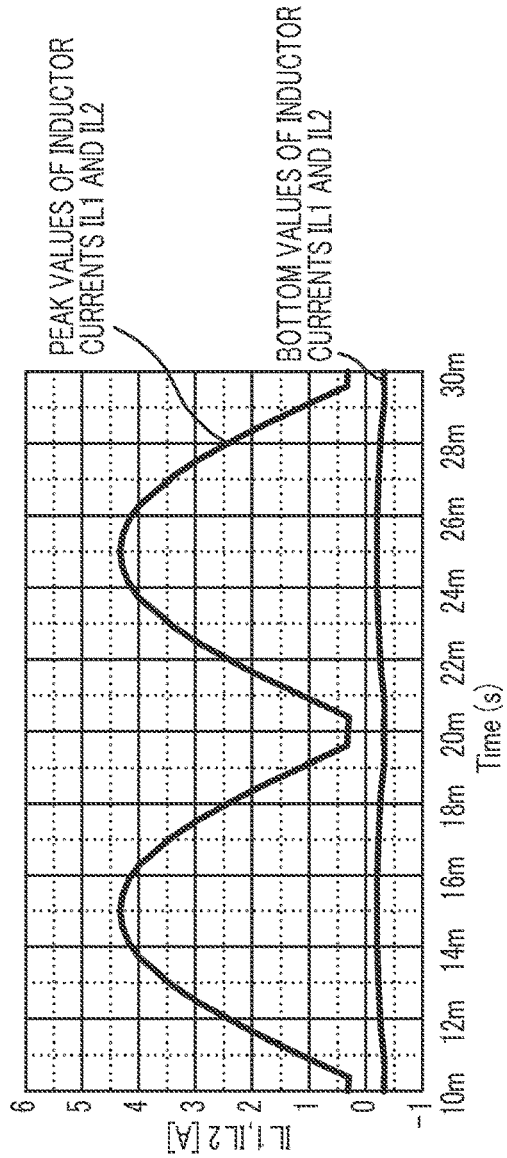
FIG. 10A  OVERALL WAVEFORM
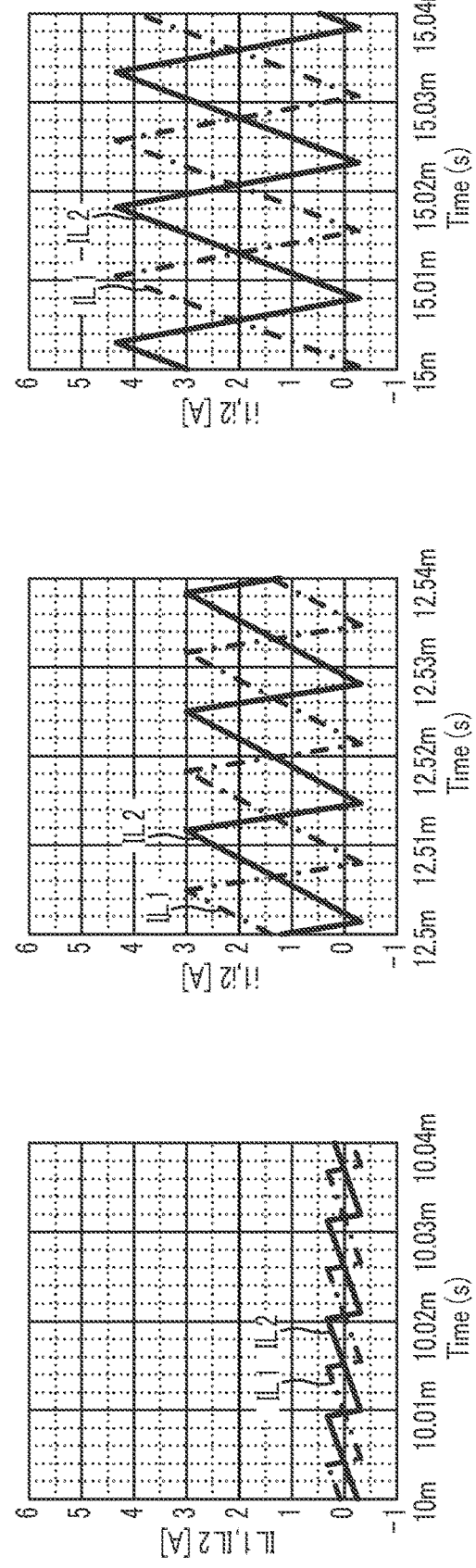
FIG. 10D  PHASE OF AROUND 90°
FIG. 10C  PHASE OF AROUND 45°
FIG. 10B  PHASE OF AROUND 0°

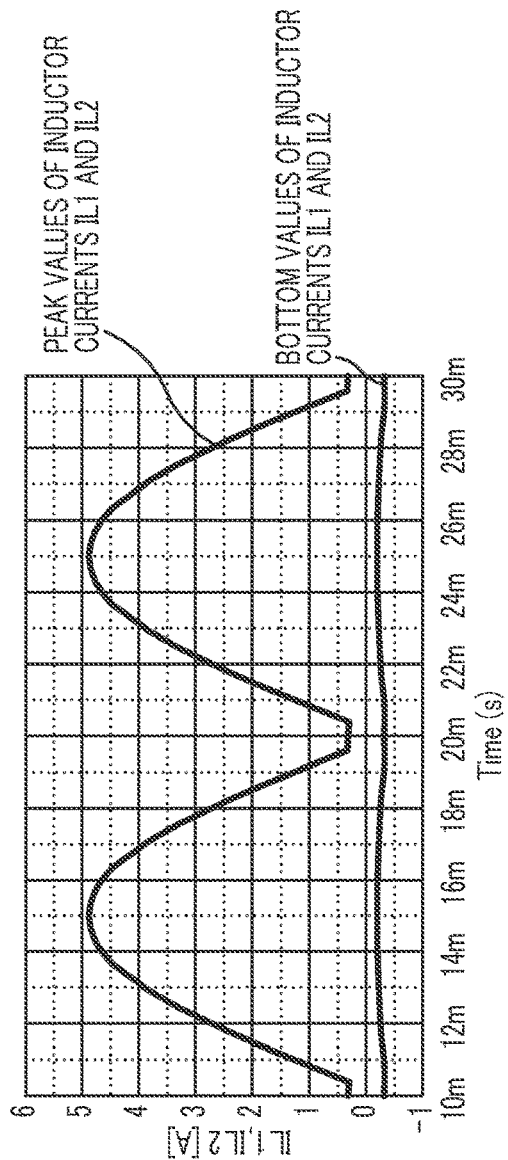
FIG. 11A OVERALL WAVEFORM
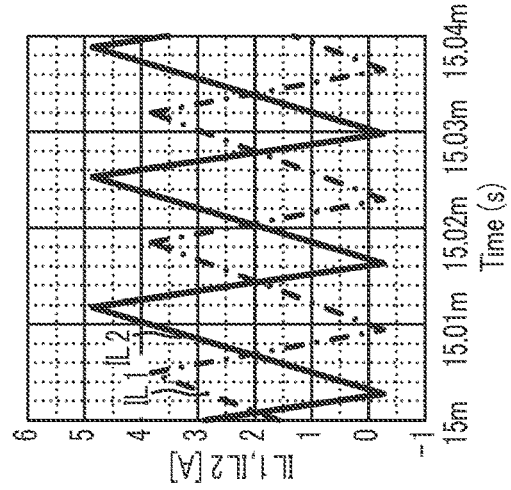
FIG. 11D PHASE OF AROUND 90°
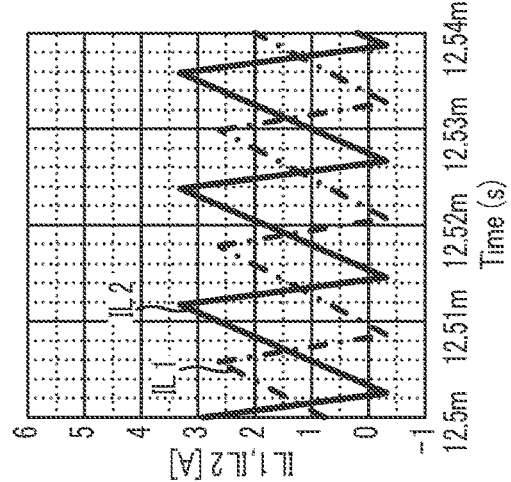
FIG. 11C PHASE OF AROUND 45°
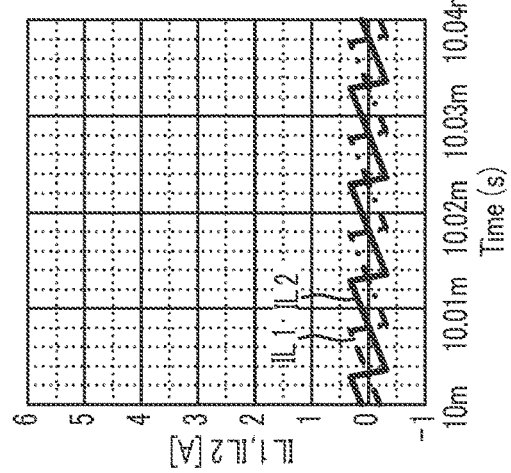
FIG. 11B PHASE OF AROUND 0°

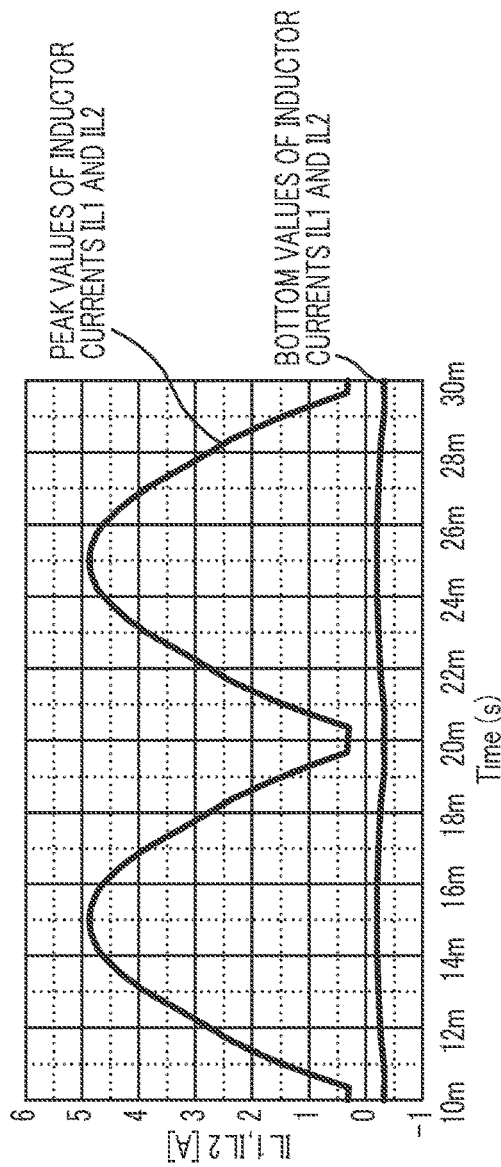
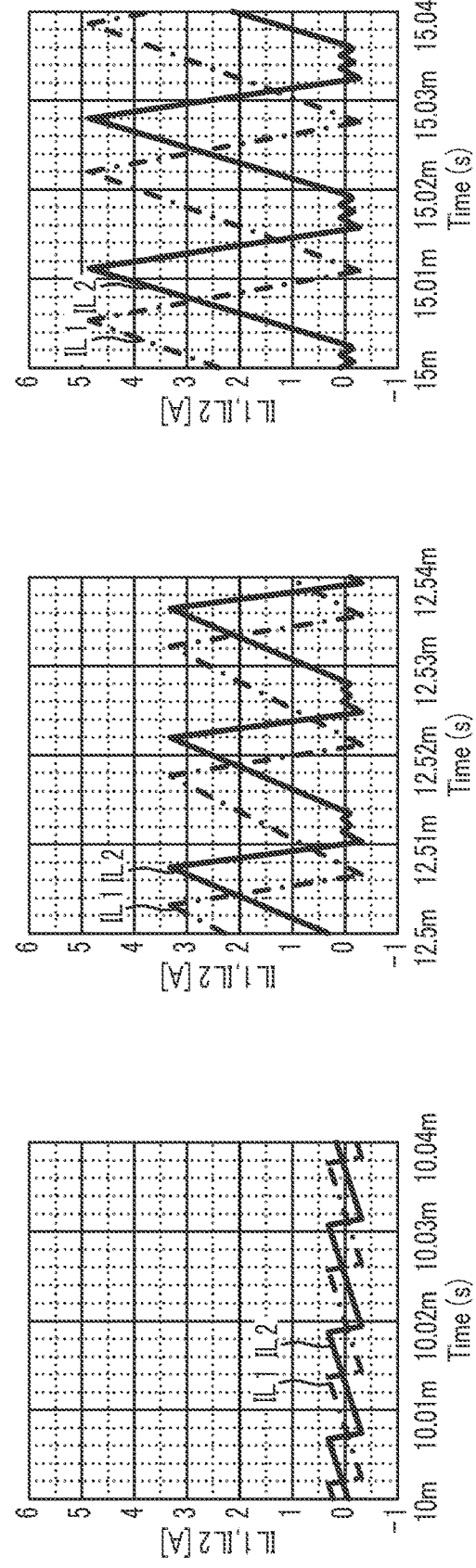
FIG. 23A OVERALL WAVEFORM
FIG. 23B PHASE OF AROUND 0°
FIG. 23C PHASE OF AROUND 45°
FIG. 23D PHASE OF AROUND 90°

SWITCHING CONTROL CIRCUIT, CONTROL CIRCUIT, AND POWER SUPPLY CIRCUIT

CROSS-REFERENCE TO RELATED APPLICATION

The present application claims priority pursuant to 35 U.S.C. § 119 from Japanese patent application number 2022-173140 filed on Oct. 28, 2022, the entire disclosure of which is hereby incorporated by reference herein.

BACKGROUND

Technical Field

The present disclosure relates to a switching control circuit, a control circuit, and a power supply circuit.

Description of the Related Art

A typical power factor correction circuit (hereinafter referred to as "power factor correction (PFC) circuit") that operates in a critical mode improves the power factor of a power supply by causing the waveform of the peak value of an inductor current flowing through an inductor to have a shape similar to the waveform shape of the rectified voltage obtained by rectifying an alternating current (AC) voltage. In this case, an interleaved operation may be performed using two or more, for example (for example, two systems) PFC circuits as one PFC circuit (for example, Japanese Patent Application Publication No. 2022-041912, WO2008/032768, Japanese Patent Application Publication No. 2010-119285, WO2011/122172, Japanese Patent Application Publication Nos. 2016-086463, 2011-229364, and 2010-016973, and "MH2501SC/MH2511SC Application Note Ver. 3.0", by Applied Technology Department, Electronic Device Division. Group, Shindengen Electric Manufacturing Co., Ltd., issued on Nov. 11, 2020, FIGS. 8 and 9, waveform 2, pp. 9-10 and p. 20).

In a PFC circuit performing an interleaved operation, an input current flows every time each of two transistors is turned on at a different timing, for example. This makes it possible to reduce switching ripple components in the input current and increase the frequency of the ripple, thereby being able to reduce the capacitance values of the filter capacitors for the full-wave rectifier circuit for example.

However, in a case of a PFC circuit that operates in a critical mode, the PFC circuit operates so as to change the switching frequencies of the transistors in accordance with the phase angle of the rectified voltage. Accordingly, for example, when the two transistors are turned on with a predetermined time difference, it may be impossible to follow the change in the switching frequency, resulting in an ineffective interleaved operation.

In addition, for example, in a case where the inductance values of the inductors whose inductor currents are controlled by two or more respective transistors are imbalanced, the peak currents of the inductor currents may not be equal when the two or more transistors are turned on with the same ON period according to the output voltage. The same applies to the case where a PFC circuit performs an interleaved operation. Such a phenomenon causes an imbalance in heat generation of the transistors. In addition, the heat generation limits the electric power allowed to be outputted from the power supply circuit.

SUMMARY

A first aspect of an embodiment of the present disclosure is a switching control circuit for a power supply circuit configured to generate an output voltage at a target level from an alternating current (AC) voltage inputted thereto, the power supply circuit including first and second inductors configured to receive a voltage according to the AC voltage, a first transistor configured to control a first inductor current flowing through the first inductor, the first transistor being configured to be turned on, after the first inductor current reaches a first predetermined value, and be turned off, in response to a first time period according to the output voltage having elapsed, and a second transistor configured to control a second inductor current flowing through the second inductor, the switching control circuit being configured to control switching of the second transistor, the switching control circuit comprising: a detection circuit configured to detect a switching period of the first transistor, and a time difference between a first timing, at which the first inductor current reaches the first predetermined value, and a second timing, at which the second inductor current reaches a second predetermined value; an error output circuit configured to output an error between a predetermined ratio and a ratio of the time difference to the switching period, the time difference and switching period being based on a result of detection of the detection circuit; and a driving signal output circuit configured to output a driving signal to turn on the second transistor, after the second inductor current reaches the second predetermined value, and output the driving signal to turn off the second transistor, in response to a second time period, which is determined according to the first time period and the error, having elapsed.

A second aspect of an embodiment of the present disclosure is a power supply circuit configured to generate an output voltage at a target level from an alternating current (AC) voltage inputted thereto, the power supply circuit comprising: first and second inductors configured to receive a voltage according to the AC voltage; a first transistor configured to control a first inductor current flowing through the first inductor; a second transistor configured to control a second inductor current flowing through the second inductor; and a switching control circuit configured to control switching of the second transistor, wherein the first transistor is configured to be turned on, after the first inductor current reaches a first predetermined value, and be turned off in response to a first time period according to the output voltage having elapsed, and the switching control circuit includes a detection circuit configured to detect a switching period of the first transistor, and a time difference between a first timing, at which the first inductor current reaches the first predetermined value, and a second timing, at which the second inductor current reaches a second predetermined value, an error output circuit configured to output an error between a predetermined ratio and a ratio of the time difference to the switching period, the time difference and switching period being based on a result of detection of the detection circuit, and a driving signal output circuit configured to output a driving signal to turn on the second transistor, after the second inductor current reaches the second predetermined value, and turn off the second transistor, in response to a second time period, which is determined according to the first time period and the error, having elapsed.

A third aspect of an embodiment of the present disclosure is a control circuit for a power supply circuit configured to generate an output voltage at a target level from an alternating current (AC) voltage inputted thereto, the power supply circuit including first and second inductors configured to receive a voltage according to the AC voltage, a first transistor configured to control a first inductor current flowing through the first inductor, a first switching control circuit configured to control switching of the first transistor, the first switching control circuit being configured to turn on the first transistor, after the first inductor current reaches a first predetermined value, and turn off the first transistor in response to a first time period according to the output voltage having elapsed, a second transistor configured to control a second inductor current flowing through the second inductor, and a second switching control circuit configured to control switching of the second transistor, the second switching control circuit being configured to turn on the second transistor, after the second inductor current reaches a second predetermined value, and turn off the second transistor, in response to a fourth time period according to the output voltage having elapsed, the control circuit being configured to control the first and second switching control circuits, and comprising: a first current detection circuit configured to detect a first peak value of the first inductor current at a time when the first transistor is turned off; a second current detection circuit configured to detect a second peak value of the second inductor current at a time when the second transistor is turned off; and a correction circuit configured to correct at least one of the first time period or the fourth time period so as to reduce a difference between the first peak value and the second peak value.

A forth aspect of an embodiment of the present disclosure is a power supply circuit configured to generate an output voltage at a target level from an alternating current (AC) voltage inputted thereto, the power supply circuit comprising: first and second inductors configured to receive a voltage according to the AC voltage; a first transistor configured to control a first inductor current flowing through the first inductor; a first switching control circuit configured to control switching of the first transistor; a second transistor configured to control a second inductor current flowing through the second inductor; a second switching control circuit configured to control switching of the second transistor; and a control circuit configured to control the first and second switching control circuits, wherein the first switching control circuit is configured to turn on the first transistor, after the first inductor current reaches a first predetermined value, and turn off the first transistor, in response to a first time period according to the output voltage having elapsed; the second switching control circuit is configured to turn on the second transistor, after the second inductor current reaches a second predetermined value, and turn off the second transistor, in response to a fourth time period according to the output voltage having elapsed; and the control circuit includes a first current detection circuit configured to detect a first peak value of the first inductor current at a time when the first transistor is turned off, a second current detection circuit configured to detect a second peak value of the second inductor current at a time when the second transistor is turned off, and a correction circuit configured to correct the first time period or the fourth time period, or both, so as to reduce a difference between the first peak value and the second peak value.

BRIEF DESCRIPTION OF THE DRAWINGS

FIG. 2 is a diagram illustrating an example of a power factor correction IC 25a.

FIG. 7 is a chart illustrating main waveforms of a power factor correction IC 25a.

FIG. 8 is a chart illustrating main waveforms of a power factor correction IC 25a.

FIG. 9 is a chart illustrating main waveforms of a power factor correction IC 25a.

FIGS. 10A to 10D are charts illustrating simulation results of a power factor correction IC 25a.

FIGS. 11A to 11D are charts illustrating simulation results of a power factor correction IC 25a.

FIGS. 23A to 23D are charts illustrating simulation results of a power factor correction IC 25b including a digital circuit 49.

FIG. 24 is a diagram illustrating an example of a modification of a power factor correction IC 25a.

DETAILED DESCRIPTION

At least following matters will become apparent from the descriptions of the present specification and the accompanying drawings. Hereinafter, it is assumed that a "circuit" of an embodiment of the present disclosure includes not only an analog circuit and a wired logic circuit but also a functional block (or means) that is included in a digital signal processor (DSP), a microcomputer, or the like and is capable of executing digital calculation processing. In the following, the same constituents that are the same are given the same reference signs, and the description thereof is omitted as appropriate.

EMBODIMENTS

<<<Overall Configuration of AC-DC Converter 10>>>

Figure 1:
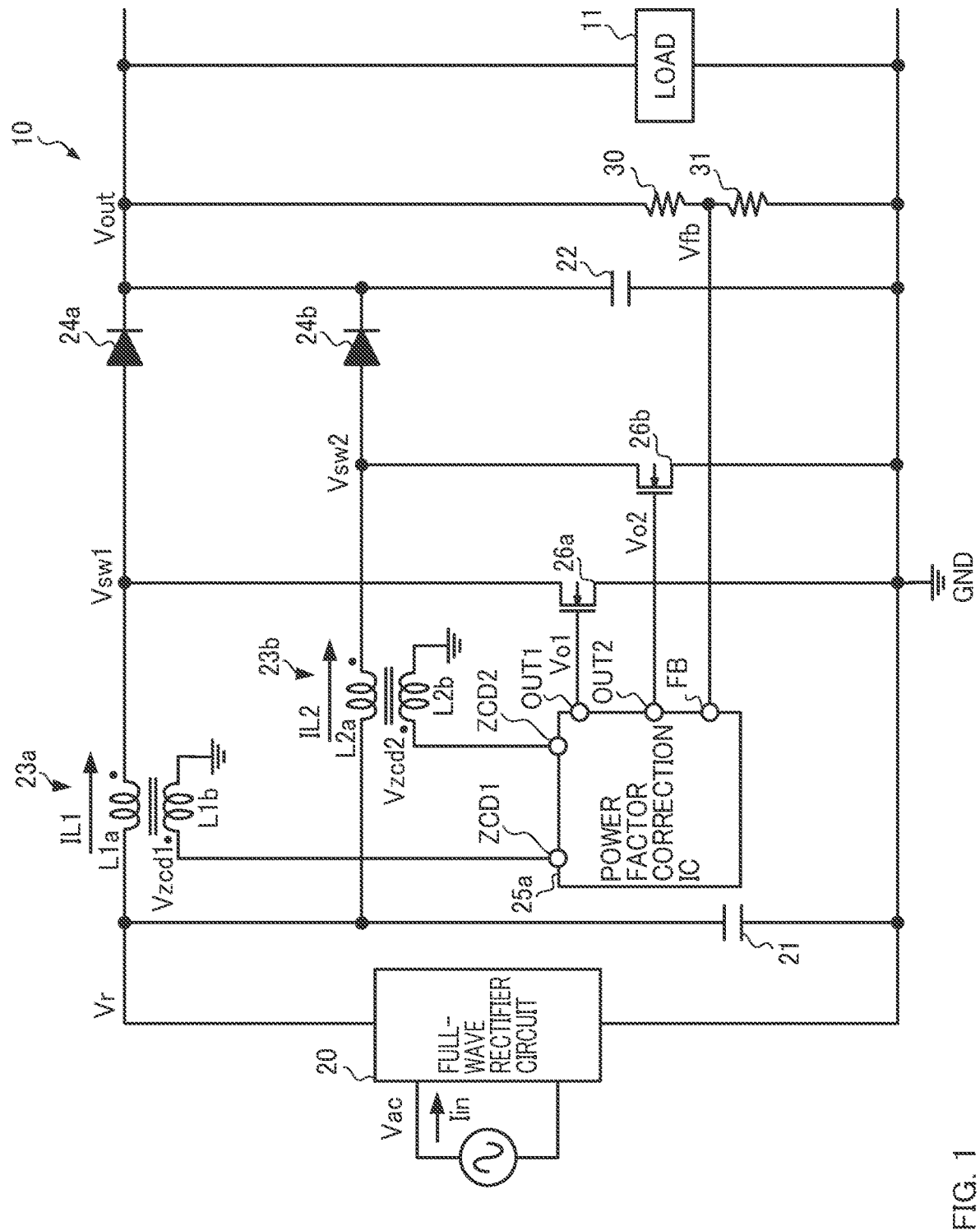
FIG. 1 is a diagram illustrating an example of an AC-DC converter 10.

FIG. 1 is a diagram illustrating a configuration of an AC-DC converter 10 according to an embodiment of the present disclosure. The AC-DC converter 10 is a boost power factor correction (PFC) circuit configured to generate an output voltage Vout at a target level from an alternating current (AC) voltage Vac of a commercial power supply.

The AC-DC converter 10 includes a full-wave rectifier circuit 20, capacitors 21 and 22, transformers 23a and 23b, diodes 24a and 24b, a power factor correction IC 25a, N-channel metal-oxide-semiconductor (NMOS) transistors 26a and 26b, and resistors 30 and 31. Note that the AC-DC converter 10 corresponds to a "power supply circuit".

The full-wave rectifier circuit 20 full-wave rectifies an inputted predetermined AC voltage Vac, to output a resultant voltage, as an input voltage Vrec, to the capacitor 21, the primary coil L1a (described later) of the transformer 23a, and the primary coil L2a (described later) of the transformer 23b. The AC voltage Vac is, for example, a voltage having an effective value from 100 to 240 V and a frequency from 50 to 60 Hz. In the following, in an embodiment of the present disclosure, although a voltage basically indicates a potential difference relative to a reference point (GND in the figures), the AC voltage Vac indicates a voltage between the terminals.

The capacitor 21 smooths the input voltage Vrec, and the capacitor 22 is an element configured to be charged with the output voltages of two boost chopper circuits. The primary coil L1a of the transformer 23a, the diode 24a, and the NMOS transistor 26a configure a first boost chopper circuit, together with the capacitor 22. The primary coil L2a of the transformer 23b, the diode 24b, and the NMOS transistor 26b configure a second boost chopper circuit, together with the capacitor 22. Thus, the charged voltage of the capacitor 22 corresponds to a direct-current (DC) output voltage Vout.

The transformer 23a includes the primary coil L1a and an auxiliary coil L1b magnetically coupled to the primary coil L1a. The winding of the auxiliary coil L1b according to an embodiment of the present disclosure is formed such that the voltage generated at the auxiliary coil L1b has a polarity opposite to that of the voltage generated at the primary coil L1a. The voltage Vzcd1 generated at the auxiliary coil L1b is applied to a terminal ZCD1 of the power factor correction IC 25a. Here, it is assumed that when an inductor current IL1 flows through the primary coil L1a in the direction of an arrow, the direction in which the inductor current IL1 flows is a positive direction, and that when an inductor current IL1 flows in the direction opposite to the direction of the arrow, the direction in which the inductor current IL1 flows is a negative direction. Note that the primary coil L1a corresponds to a "first inductor".

Similarly, the transformer 23b includes the primary coil L2a and an auxiliary coil L2b magnetically coupled to the primary coil L2a. The winding of the auxiliary coil L2b according to an embodiment of the present disclosure is formed such that the voltage generated at the auxiliary coil L2b has a polarity opposite to that of the voltage generated at the primary coil L2a. The voltage Vzcd2 generated at the auxiliary coil L2b is applied to a terminal ZCD2 of the power factor correction IC 25a. Here, it is assumed that when an inductor current IL2 flows through the primary coil L2a in the direction of an arrow, the direction in which the inductor current IL2 flows is the positive direction, and that when an inductor current IL2 flows in the direction opposite to the direction of the arrow, the direction in which the inductor current IL2 flows is the negative direction. Note that the primary coil L2a corresponds to a "second inductor".

The power factor correction IC 25a is an integrated circuit configured to control switching of the NMOS transistors 26a and 26b such that the level of the output voltage Vout reaches a target level (e.g., 400 V) while improving the input power factor of the AC-DC converter 10. Specifically, the power factor correction IC 25a drives the NMOS transistor 26a, based on the inductor current IL1 flowing through the primary coil L1a and the output voltage Vout. Note that the inductor current IL1 corresponds to a "first inductor current".

The power factor correction IC 25a also drives the NMOS transistor 26b in accordance with the inductor current IL2 flowing through the primary coil L2a and the ON period of the NMOS transistor 26a. The power factor correction IC 25a has terminals ZCD1, ZCD2, FB, OUT1, and OUT2, and the details of the power factor correction IC 25a will be described later. In an embodiment of the present disclosure, illustration of terminals (e.g., a ground terminal) of the power factor correction IC 25a other than the terminal ZCD1 and the like is omitted for convenience. Note that the inductor current IL2 corresponds to a "second inductor current".

The NMOS transistors 26a and 26b are power transistors to control the electric power to the load 11 of the AC-DC converter 10. The NMOS transistors 26a and 26b are N-channel metal oxide semiconductor (NMOS) transistors in an embodiment of the present disclosure, however, these transistors are not limited thereto. For example, the NMOS transistors 26a and 26b may be other switching devices such as bipolar transistors. The gate electrode of the NMOS transistor 26a is coupled to the terminal OUT1, and the gate electrode of the NMOS transistor 26b is coupled to the terminal OUT2. Note that the NMOS transistor 26a corresponds to a "first transistor", and the NMOS transistor 26b corresponds to a "second transistor".

The resistors 30 and 31 constitute a voltage divider circuit configured to divide the output voltage Vout, to thereby generate a feedback voltage Vfb used in switching the NMOS transistor 26a. The feedback voltage Vfb generated at the node at which the resistors 30 and 31 are coupled is applied to the terminal FB.

<<<Description of Power Factor Correction IC 25a>>>

==Configuration of Power Factor Correction IC 25a==

Figure 2:
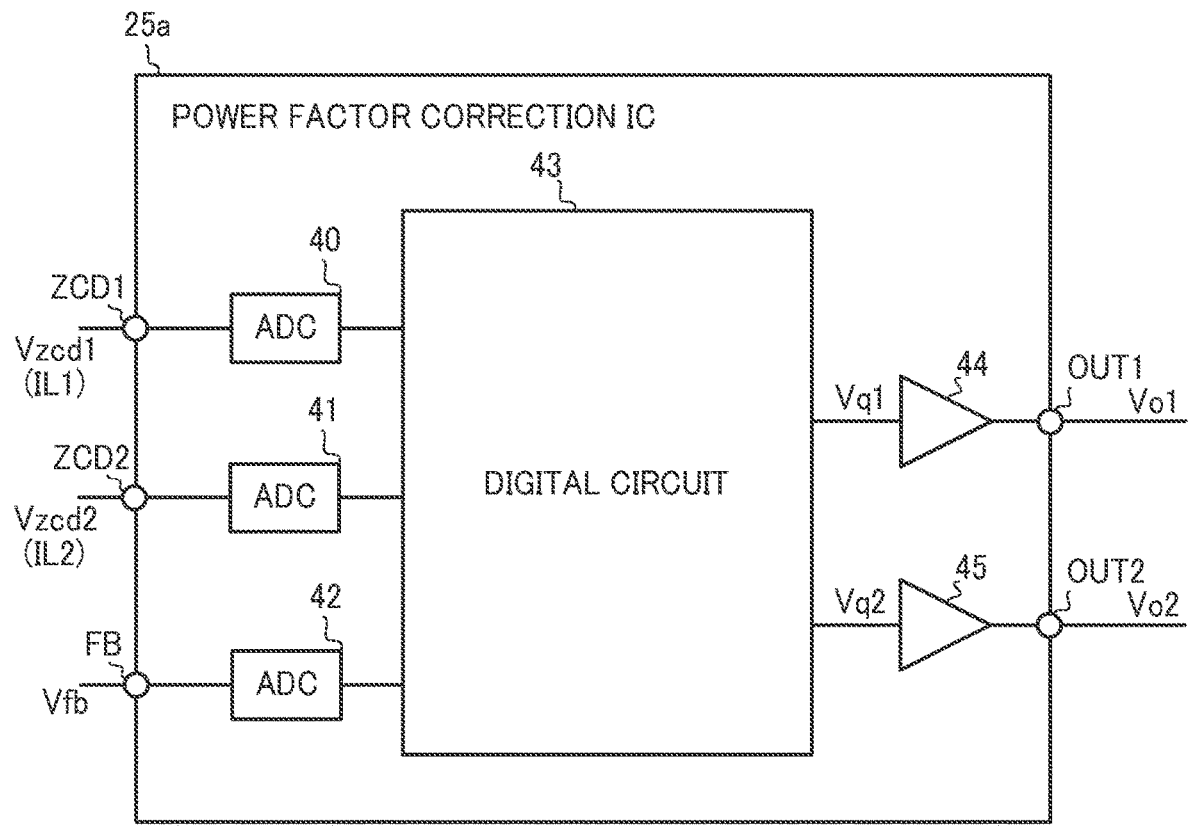

FIG. 2 is a diagram illustrating an example of the power factor correction IC 25a. The power factor correction IC 25a includes analog-to-digital converters (AD converters or ADCs) 40 to 42, a digital circuit 43, and buffer circuits 44 and 45.

The AD converter 40 converts the voltage Vzcd1 into a digital value, the AD converter 41 converts the voltage Vzcd2 into a digital value, and the AD converter 42 converts the feedback voltage Vfb into a digital value.

The digital circuit 43 is configured to output driving signals Vq1 and Vq2 to drive the NMOS transistors 26a and 26b, based on the feedback voltage Vfb and the voltages Vzcd1 and Vzcd2 respectively according to the inductor currents IL1 and IL2. The digital circuit 43 is a wired logic circuit configured to execute various types of calculation, and includes, for example, logic gates, flip-flops, and memory. However, the digital circuit 43 may be a digital signal processor (DSP) or a microcomputer. Details of the digital circuit 43 will be described later.

The buffer circuit 44 is a driver circuit configured to drive the NMOS transistor 26a in response to the driving signal Vq1. Specifically, in response to the driving signal Vq1 going high (hereinafter, referred to as high or high level), the buffer circuit 44 turns on the NMOS transistor 26a, and in response to the driving signal Vq1 going low (hereinafter, referred to as low or low level), the buffer circuit 44 turns off the NMOS transistor 26a.

Similarly, the buffer circuit 45 is a driver circuit configured to drive the NMOS transistor 26b in response to the driving signal Vq2. Specifically, in response to the driving signal Vq2 going high, the buffer circuit 45 turns on the NMOS transistor 26b, and in response to the driving signal Vq2 going low, the buffer circuit 45 turns off the NMOS transistor 26b.

==Digital Circuit 43==

Figure 3:
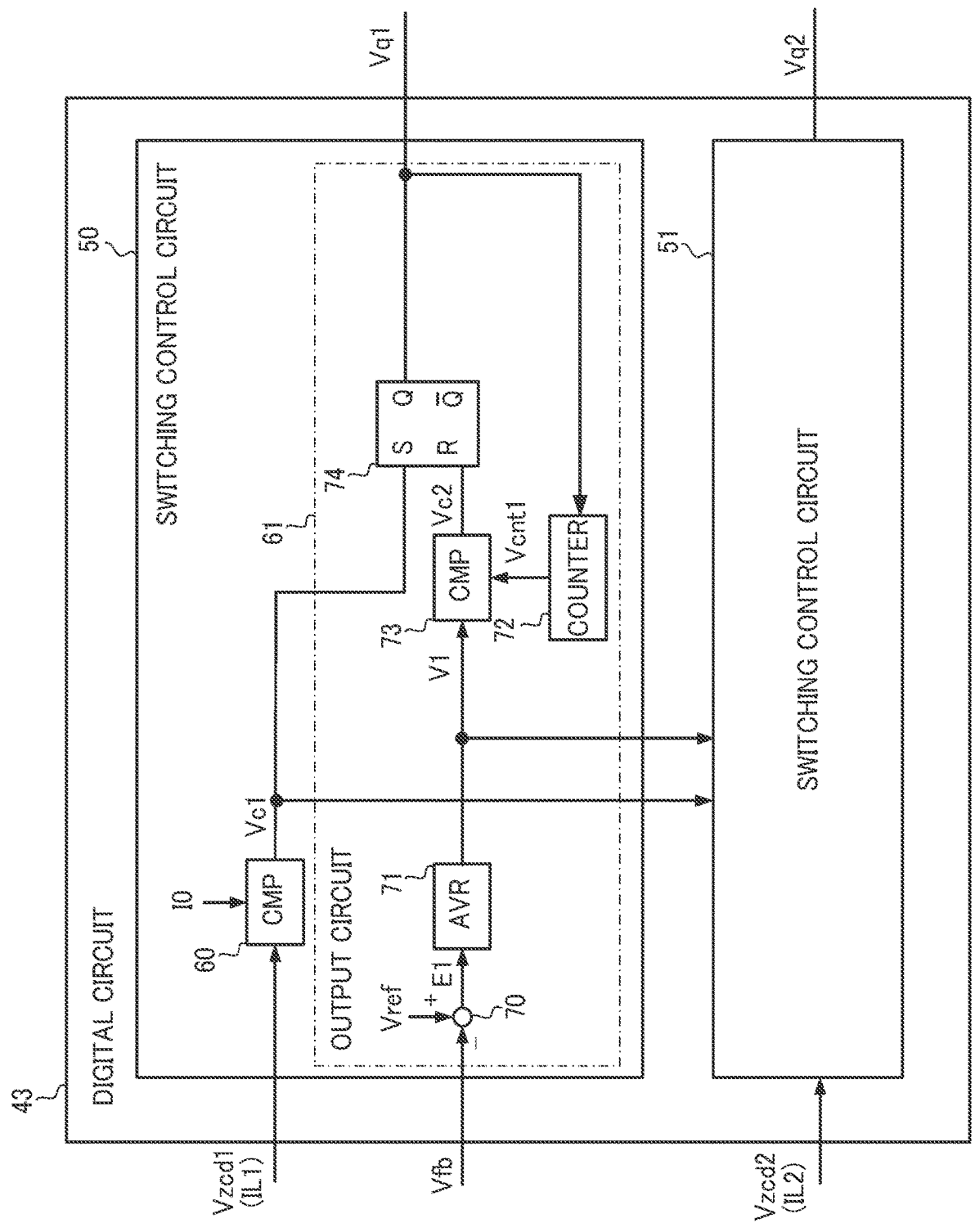
FIG. 3 is a diagram illustrating an example of a digital circuit 43 and a switching control circuit 50.

FIG. 3 is an example of the digital circuit 43 including a basic circuit to improve the power factor. The digital circuit 43 of an embodiment of the present disclosure includes a switching control circuit 50 configured to control switching of the NMOS transistor 26a and a switching control circuit 51 configured to control switching of the NMOS transistor 26b. Here, a basic configuration to improve the power factor will be described with reference to the switching control circuit 50 in FIG. 3.

==Configuration of Switching Control Circuit 50==

The switching control circuit 50 outputs the driving signal Vq1 to control switching of the NMOS transistor 26a, based on the feedback voltage Vfb and the voltage Vzcd1 corresponding to the inductor current IL1. Specifically, in response to the inductor current IL1 reaching substantially zero, the switching control circuit 50 outputs a driving signal Vq1 to turn on the NMOS transistor 26a. Then, in response to a time period T1 according to the output voltage Vout having elapsed, the switching control circuit 50 outputs a driving signal Vq1 to turn off the NMOS transistor 26a. The switching control circuit 50 includes a comparator circuit 60 and an output circuit 61. Hereinafter, a description will be given, assuming that the switching control circuit 50 receives the voltage Vzcd1 as a digital value and the feedback voltage Vfb as a digital value. Note that the time period T1 corresponds to a "first time period".

In response to the current value of the inductor current IL1 reaching a predetermined current value I0, which is slightly larger than zero (e.g., several mA, in other words, substantially zero (hereinafter "substantially zero" is simply referred to as "0" (zero) as appropriate)), the comparator circuit 60 detects the timing at which the NMOS transistor 26a is turned on. Specifically, in response to the voltage Vzcd1, which indicates the current value of the inductor current IL1, dropping below the predetermined voltage, which indicates the current value I0, and the inductor current IL1 reaching zero, the comparator circuit 60 outputs a high signal Vc1. Meanwhile, in response to the voltage Vzcd1, which indicates the current value of the inductor current IL1 exceeding the predetermined voltage, which indicates the current value I0, the comparator circuit 60 outputs a low signal Vc1. Note that the current value I0 corresponds to a "first predetermined value".

The output circuit 61 outputs the driving signal Vq1 to control switching of the NMOS transistor 26a, based on the signal Vc1 and the feedback voltage Vfb. Specifically, the output circuit 61 outputs a driving signal Vq1 to turn on the NMOS transistor 26a, in response to the signal Vc1 from the comparator circuit 60 indicating the timing at which the NMOS transistor 26a is turned on. Thereafter, in response to the time period T1 according to the output voltage having elapsed, the output circuit 61 outputs a driving signal Vq1 to turn off the NMOS transistor 26a. The output circuit 61 includes a subtractor circuit 70, an automatic voltage regulator (AVR) 71, a counter 72, a comparator circuit 73, and an RS flip-flop 74.

The subtractor circuit 70 subtracts the feedback voltage Vfb from a reference voltage Vref serving as a reference of the output voltage Vout at a target level (e.g., 400 V), to thereby calculate an error E1 between the reference voltage Vref and the feedback voltage Vfb.

The automatic voltage regulator 71 outputs, according to the error E1, a command value V1 to cause the level of the feedback voltage Vfb to be equal to the level of the reference voltage Vref. The command value V1 indicates the time period T1. The subtractor circuit 70 and the automatic voltage regulator 71 of an embodiment of the present disclosure correspond to a so-called error amplifier circuit configured to perform amplification, integration, and the like of the error E1, for example.

The counter 72 is a circuit configured to output a signal Vcnt1 to determine the timing at which the NMOS transistor 26a is turned off. in response to the driving signal Vq1 going high, the counter 72 increments the count value from zero in response to a clock signal (not illustrated). Specifically, in response to the driving signal Vq1 going high, the counter 72 outputs a signal corresponding to a ramp wave in which the value of the signal Vcnt1 increases in proportion to an elapsed time.

The comparator circuit 73 compares the magnitudes between the command value V1 indicating the time period T1 and the signal Vcnt1. Specifically, when the signal Vcnt1 is larger than the command value V1, the comparator circuit 73 outputs a high signal Vc2, and when the signal Vcnt1 is smaller than the command value V1, the comparator circuit 73 outputs a low signal Vc2.

The RS flip-flop 74 receives the signal Vc1 at the input S and the signal Vc2 at the input R. Accordingly, in response to the signal Vc1 going high, the signal Vq1, which is the output Q of the RS flip-flop 74, goes high, meanwhile, in response to the signal Vc2 going high, the signal Vq1 goes low.

==Operation of Switching Control Circuit 50==

Figure 4:
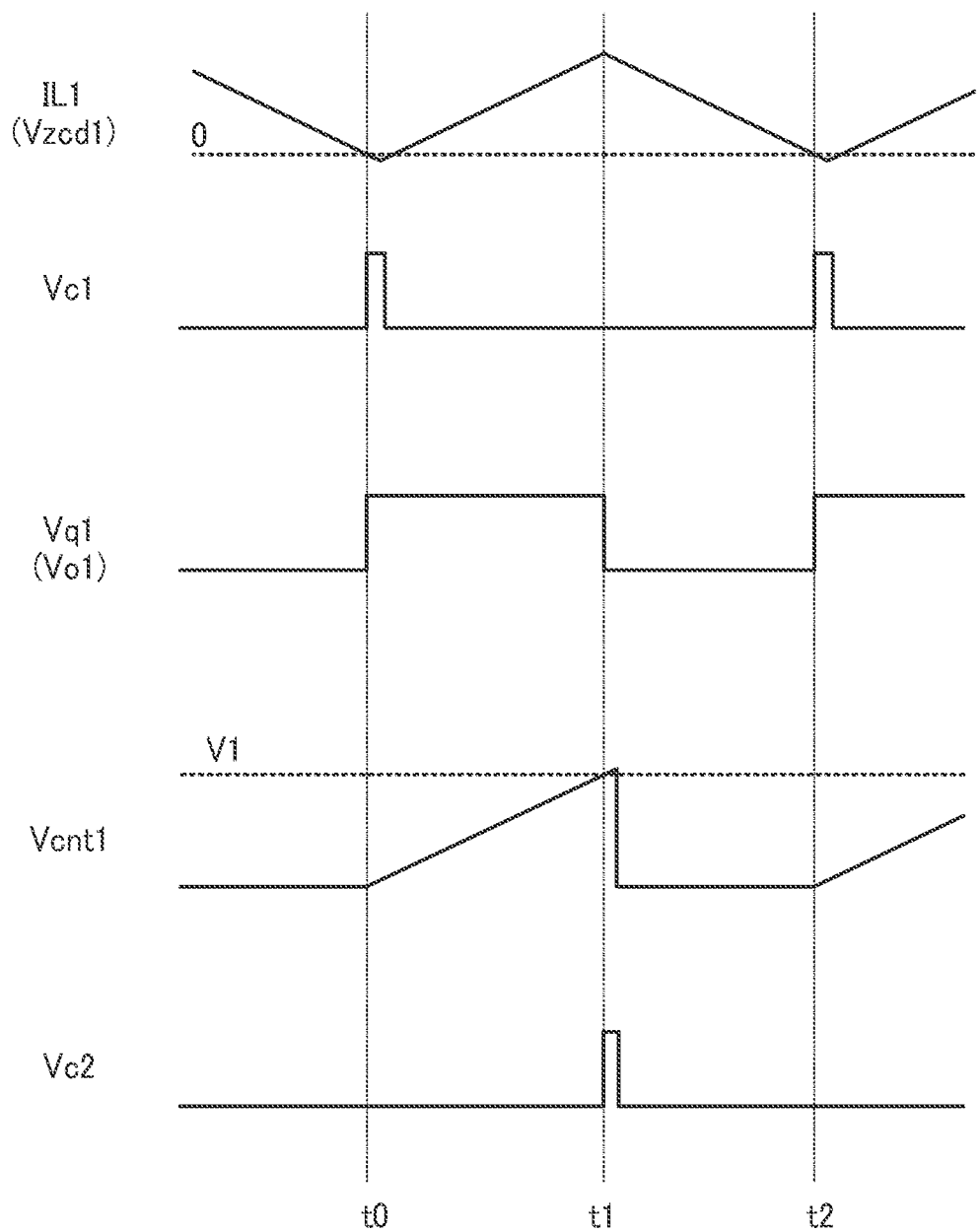
FIG. 4 is a chart illustrating main waveforms of a switching control circuit 50.

With reference to FIG. 4, a description will be given of the operation of the switching control circuit 50 when the AC-DC converter 10 generates the output voltage Vout at a target level from a predetermined AC voltage Vac and provides a constant load with electric power.

First, in response to the inductor current IL1 decreasing to the current value I0 at time t0, the comparator circuit 60 changes the signal Vc1 to high. Then, in response to the signal Vc1 going high, the RS flip-flop 74 outputs a high signal Vq1.

In response to the driving signal Vq1 going high, the NMOS transistor 26a is turned on, and thus the inductor current IL1 increases.

Further, in response to the driving signal Vq1 going high, the counter 72 increments the count value, and thus the signal Vcnt1 increases. In response to the level of the signal Vcnt1 exceeding the level of the command value V1 at time t1, the comparator circuit 73 changes the signal Vc2 to high. As a result, the RS flip-flop 74 is reset, and the driving signal Vq1 goes low.

In response to the driving signal Vq1 going low, the NMOS transistor 26a is turned off. Accordingly, the inductor current IL1 gradually decreases. In response to the inductor current IL1 decreasing to zero at time t2, the operation from time t0 repeats.

Here, when the AC-DC converter 10 is generating the output voltage Vout at the target level from the predetermined AC voltage Vac, the capacitance of the capacitor 22 is sufficiently large, and the feedback voltage Vfb is substantially constant in the time period corresponding to one cycle of the AC voltage Vac. As a result, the command value V1 outputted from the automatic voltage regulator 71 is also substantially constant, and thus the time period during which the NMOS transistor 26a is on (e.g., the time period from time t0 to time t1) is also substantially constant.

Figure 5:
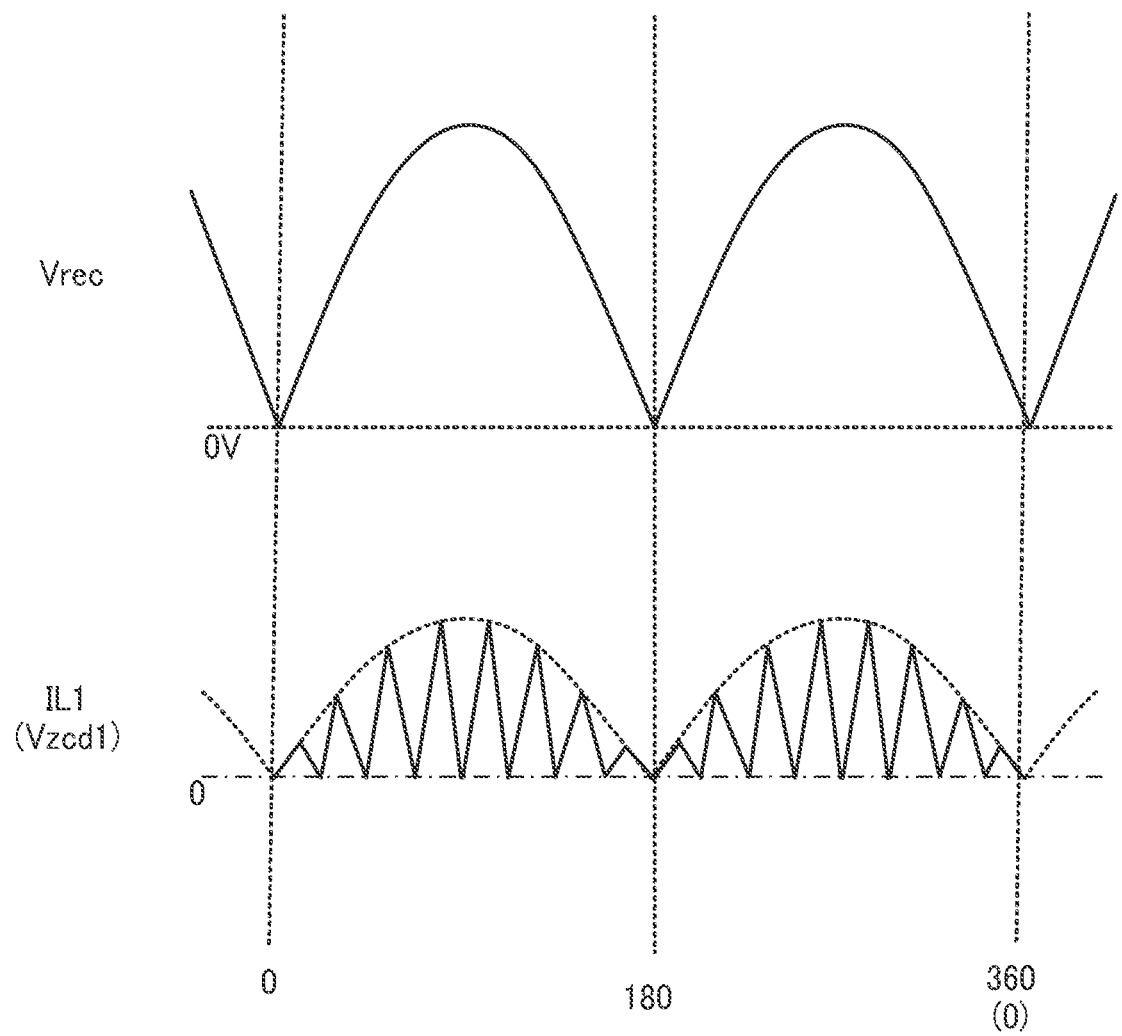
FIG. 5 is a chart for explaining main waveforms of an AC-DC converter 10.

Further, in response to the level of the voltage Vrec obtained by rectifying the AC voltage Vac rising when the NMOS transistor 26a is turned on, the current value of the inductor current IL1 also increases. Accordingly, as illustrated in FIG. 5, the waveform of the peak values of the inductor current IL1 has a shape similar to the waveform shape of the voltage Vrec.

Further, in response to the level of the peak value of the inductor current IL1 when the NMOS transistor 26a is turned off rising, the time taken for the inductor current IL1 to reach zero when the NMOS transistor 26a is off increases. Accordingly, when the level of the voltage Vrec is low, the switching frequency of the NMOS transistor 26a is high, and when the level of the voltage Vrec is high, the switching frequency of the NMOS transistor 26a is low.

==Configuration of Switching Control Circuit 51==

Figure 6:
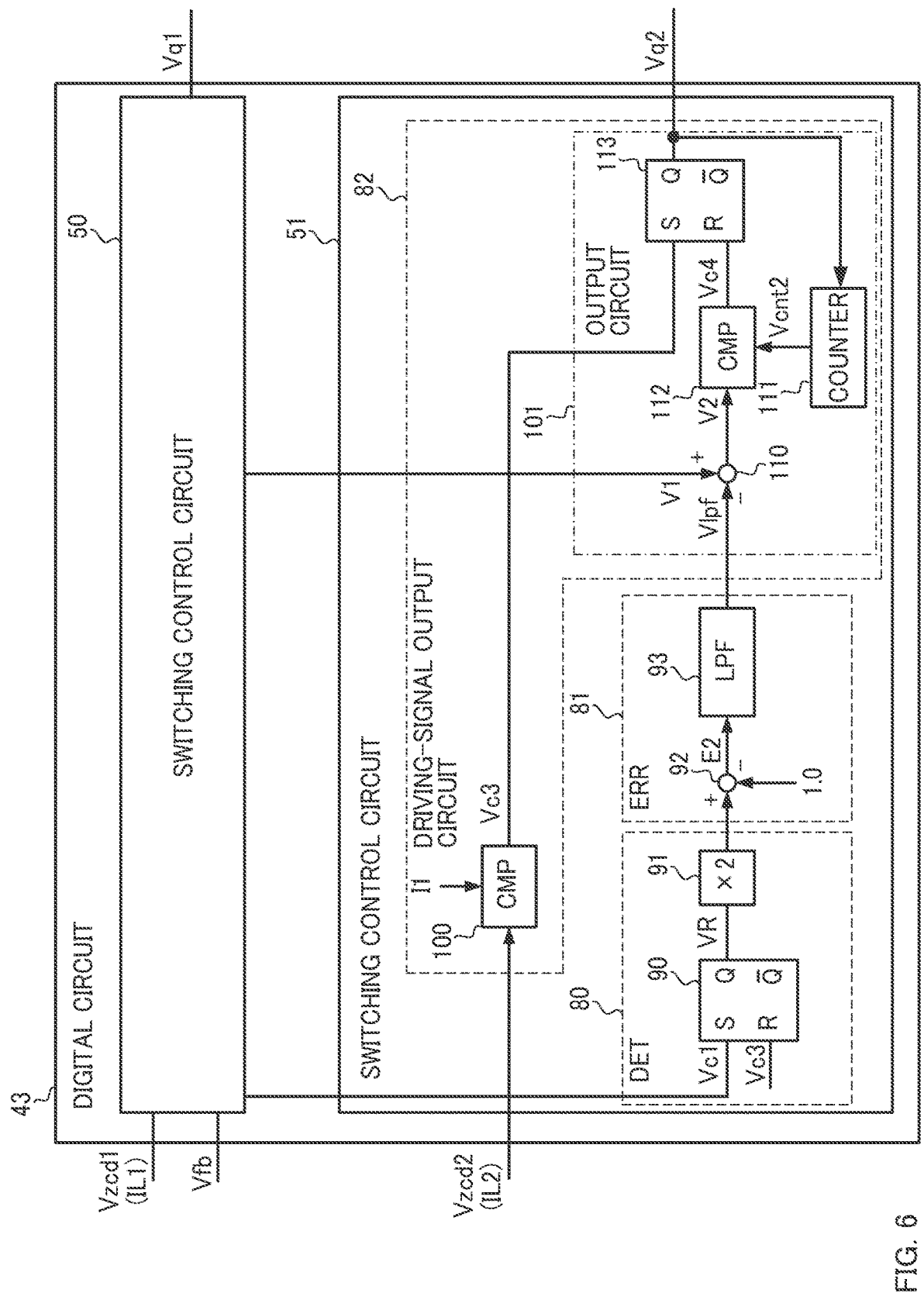
FIG. 6 is a diagram illustrating an example of a switching control circuit 51.

The switching control circuit 51 illustrated in FIG. 6 outputs the driving signal Vq2 to control switching of the NMOS transistor 26b, based on the voltage Vzcd2 corresponding to the inductor current IL2, the signal Vc1, and the command value V1. The switching control circuit 51 outputs the driving signal Vq2 so as to follow the switching frequency of the NMOS transistor 26a to perform an interleaved operation. Specifically, the switching control circuit 51 detects the phase difference Δθ for the interleaved operation (i.e., a time difference Tθ according to the phase difference Δθ) and the switching period of the NMOS transistor 26a, based on the signal Vc1 from the switching control circuit 50. Then, the switching control circuit 51 outputs the driving signal Vq2 to control switching of the NMOS transistor 26b, based on the command value V1 from the switching control circuit 50, a switching period Ta of the NMOS transistor 26a, and the time difference Tθ.

The switching control circuit 51 includes a detection circuit 80, an error output circuit 81, and a driving signal output circuit 82. Hereinafter, a description will be given assuming that the switching control circuit 51 receives the voltage Vzcd2 as a digital value, the signal Vc1, and the command value V1. Note that the switching control circuit 51 corresponds to a "switching control circuit" configured to maintain the interleaved operation.

The detection circuit (DET) 80 detects the time difference Tθ between the inductor currents IL1 and IL2 and the switching period Ta of the NMOS transistor 26a. Specifically, the detection circuit 80 detects the time difference Tθ, based on the signal Vc1, which indicates the ON timing of the NMOS transistor 26a and is outputted by the switching control circuit 50, and a signal Vc3, which indicates the ON timing of the NMOS transistor 26b and is outputted by a comparator circuit 100 (described later). At the same time, the detection circuit 80 detects the switching period Ta of the NMOS transistor 26a, based on the signal Vc1.

Note that the timing at which the voltage Vzcd1 reaches the predetermined voltage indicating the current value I0 corresponds to a "first timing". The detection circuit 80 includes an RS flip-flop 90 and a level shifter circuit 91.

The RS flip-flop 90 detects the time difference Tθ and the switching period Ta, to output a signal VR indicating the ratio R of the time difference Tθ to the switching period Ta. Specifically, the RS flip-flop 90 outputs a high signal VR, upon receiving a high signal Vc1, and outputs a low signal VR, upon receiving a high signal Vc3. With this, the RS flip-flop 90 detects the time difference Tθ as the time period during which the signal VR is high, and detects the switching period Ta each time the signal VR goes high. Accordingly, the signal VR from the RS flip-flop 90 indicates the duty (i.e., the ratio) of the time difference Tθ between the inductor currents IL1 and IL2 relative to the switching period Ta. Note that the RS flip-flop 90 corresponds to a "signal output circuit". In addition, the high level corresponds to a "first level", and the low level corresponds to a "second level".

The level shifter circuit 91 shifts the level of the signal VR from the RS flip-flop 90 to simplify the circuit configuration in an embodiment of the present disclosure, which will be described later in detail. Specifically, in the case in which the RS flip-flop 90 operates at a power supply voltage Vdd, the level shifter circuit 91 changes the voltage level of the high signal VR to the voltage level of twice the power supply voltage Vdd while keeping the voltage level of the low signal VR from the RS flip-flop 90 at the ground level.

The error output circuit (ERR) 81 outputs the error between the ratio R of the time difference Tθ to the switching period Ta and a predetermined ratio. Specifically, the error output circuit 81 subtracts the value indicating the predetermined ratio from the signal from the level shifter circuit 91, integrates a result of subtraction, to thereby output a resultant as a command value Vlpf. Although details will be described later, because the two boost chopper circuits respectively including the NMOS transistors 26a and 26b perform an interleaved operation in an embodiment of the present disclosure, the predetermined ratio is 50%, and the value indicating the predetermined ratio is "1.0". The error output circuit 81 includes a subtractor circuit 92 and a low-pass filter 93.

The subtractor circuit 92 subtracts the value indicating the predetermined ratio from the level of the signal from the level shifter circuit 91, to thereby output a resultant as an error E2, and causes the low-pass filter 93 to output the command value Vlpf of zero when the ratio R of the time difference Tθ to the switching period Ta is equal to the predetermined ratio. Specifically, the subtractor circuit 92 subtracts the power supply voltage Vdd corresponding to the value "1.0" indicating the predetermined ratio from the signal from the level shifter circuit 91 which varies from 0 V to (2×Vdd) V, to thereby output a resultant as the error E2.

Accordingly, when the ratio R of the time difference Tθ to the switching period Ta is equal to the predetermined ratio, and the level shifter circuit 91 outputs a signal in which the ratio of the high level to the one switching period Ta is 50%, the subtractor circuit 92 causes the low-pass filter 93 to output the command value Vlpf of zero. As such, in an embodiment of the present disclosure, the value to be subtracted by the subtractor circuit 92 is the value of "1.0" indicating the predetermined ratio, and thus the subtractor circuit 92 can easily cause the low-pass filter 93 to output the command value Vlpf of zero when the ratio R of the time difference Tθ to the switching period Ta is equal to the predetermined ratio.

Note that, in an embodiment of the present disclosure, a description is given of a case in which two boost chopper circuits perform an interleaved operation. In this case, the phase difference Δθ to perform an appropriate interleaved operation is 360 degrees/2=180 degrees in one switching period. When the phase difference Δθ in one switching period Ta is 180 degrees, the predetermined ratio is 50%.

When the predetermined ratio is 50%, the subtractor circuit 92 subtracts the value "1.0" indicating the predetermined ratio (50%) from the level-shifted signal. This makes it possible that the subtractor circuit 92 causes the low-pass filter 93 to output the command value Vlpf of zero when the ratio R of the time difference Tθ to the switching period Ta is equal to the predetermined ratio.

Meanwhile, in the case in which n (n is three or more) boost chopper circuits perform an interleaved operation, the phase difference Δθ to perform an appropriate interleaved operation is 360 degrees/n in one switching period Ta. When the phase difference Δθ in one switching period Ta is 360 degrees/n, the predetermined ratio is (100/n) %.

In the case in which the predetermined ratio is (100/n) %, the subtractor circuit 92 subtracts the value (2/n) indicating the predetermined ratio (100/n) % from the level-shifted signal. Thus, when the ratio R of the time difference Tθ to the switching period Ta is equal to the predetermined ratio, the subtractor circuit 92 enables the low-pass filter 93 to output the command value Vlpf of zero.

Hereinabove, a description has been given of a case in which the level shifter circuit 91 shifts the level of the signal VR from the RS flip-flop 90 to a voltage level of (2×Vdd) V. Here, in a case in which the level shifter circuit 91 shifts the level of the signal VR from the RS flip-flop 90 to a voltage level of (m×Vdd) V (m is a positive real number), and n boost chopper circuits perform an interleaved operation, the subtractor circuit 92 subtracts the value (m/n) indicating the predetermined ratio from the level-shifted signal. This makes it possible that the subtractor circuit 92 causes the low-pass filter 93 to output the command value Vlpf of zero, when the ratio R of the time difference Tθ to the switching period Ta is equal to the predetermined ratio.

The subtractor circuit 92 corresponds to a "subtractor circuit", the "value" indicating the predetermined ratio corresponds to a "reference level", and the error E2 corresponds to a "difference".

The low-pass filter (LPF) 93 integrates the error E2 from the subtractor circuit 92, to thereby output a resultant as the command value Vlpf. Note that the low-pass filter 93 corresponds to an "integrator circuit", and the command value Vlpf corresponds to an "error".

The driving signal output circuit 82 outputs the driving signal Vq2 to control switching of the NMOS transistor 26b, based on the voltage Vzcd2 and the command values V1 and Vlpf. Specifically, the driving signal output circuit 82 outputs the driving signal Vq2 to turn on the NMOS transistor 26b after the inductor current IL2 reaches a current value I1, and outputs the driving signal Vq2 to turn off the NMOS transistor 26b in response to the time period T2 according to the command values V1 and Vlpf having elapsed. The driving signal output circuit 82 includes the comparator circuit 100 and an output circuit 101. Note that the time period T2 corresponds to a "second time period".

In response to the current value of the inductor current IL2 reaching a predetermined current value I1 which is slightly larger than zero (e.g., several mA, in other words, zero), the comparator circuit 100 detects the timing at which the NMOS transistor 26b is turned on. Specifically, in response to the current value of the inductor current IL2 becoming smaller than the current value I1 and reaching zero, the comparator circuit 100 outputs a high signal Vc3. Meanwhile, when the current value of the inductor current IL2 is larger than the current value I1, the comparator circuit 100 outputs a low signal Vc3. Note that the current value I1 corresponds to a "second predetermined value", and the timing at which the voltage Vzcd2 reaches the predetermined voltage indicating the current value I1 corresponds to a "second timing".

The output circuit 101 outputs the driving signal Vq2 to control switching of the NMOS transistor 26b, based on the signal Vc3 and the command values V1 and Vlpf. Specifically, the output circuit 101 outputs the driving signal Vq2 to turn on the NMOS transistor 26b, based on the timing at which the NMOS transistor 26b is turned on, which is obtained from the comparator circuit 100. Thereafter, in response to the time period T2 according to the command value V1 and the command value Vlpf having elapsed, the output circuit 101 outputs the driving signal Vq2 to turn off the NMOS transistor 26b. The output circuit 101 includes a subtractor circuit 110, a counter 111, a comparator circuit 112, and an RS flip-flop 113.

The subtractor circuit 110 outputs a command value V2 indicating the time period T2 such that the ratio R of the time difference Tθ to the switching period Ta becomes equal to the predetermined ratio, based on the command value V1 indicating the time period T1 and the command value Vlpf according to the ratio R of the time difference Tθ to the switching period Ta. Specifically, the subtractor circuit 110 subtracts the command value Vlpf from the command value V1, to thereby output a resultant as the command value V2.

Although details will be described later, when the switching frequency of the NMOS transistor 26a rises, the switching frequency of the NMOS transistor 26b remains low, and the time difference Tθ increases, the ratio R exceeds the predetermined ratio, and the command value Vlpf becomes a positive value. In this case, the command value V2 indicating the time period T2 becomes smaller than the command value V1 indicating the time period T1.

Then, since the time period T2 indicating the ON period of the NMOS transistor 26b decreases, and the peak value of the inductor current IL2 decreases. Thus, the switching period of the NMOS transistor 26b decreases, and the switching frequency increases. Since the switching period of the NMOS transistor 26b decreases, the timing at which the NMOS transistor 26b is turned on next time is advanced, and the ratio R decreases and approaches the predetermined ratio.

Meanwhile, when the switching frequency of the NMOS transistor 26a decreases, the switching frequency of the NMOS transistor 26b remains high, and when the time difference Tθ decreases, the ratio R becomes smaller than the predetermined ratio, and the command value Vlpf results in a negative value. In this case, the command value V2 indicating the time period T2 exceeds the command value V1 indicating the time period T1.

Then, the time period T2 indicating the ON period of the NMOS transistor 26b increases, and thus the peak value of the inductor current IL2 increases. Accordingly, the switching period of the NMOS transistor 26b increases, and the switching frequency decreases. Since the switching period of the NMOS transistor 26b increases, the timing at which the NMOS transistor 26b is turned on next time is delayed, and the ratio R increases and approaches the predetermined ratio.

As such, the subtractor circuit 110 outputs the command value V2 indicating the time period T2 according to the command value V1 and the command value Vlpf, and thus the switching control circuit 51 can control switching of the NMOS transistor 26b so as to follow the change in the switching frequency of the NMOS transistor 26a and to maintain an appropriate interleaved operation.

The counter 111 is a circuit configured to output a signal Vcnt2 to determine the timing at which the NMOS transistor 26b is turned off. In response to the driving signal Vq2 going high, the counter 111 increments the count value from zero in response to a clock signal (not illustrated). Specifically, in response to the driving signal Vq2 going high, the counter 111 outputs a signal corresponding to a ramp wave in which the value of the signal Vcnt2 increases in proportion to an elapsed time.

The comparator circuit 112 compares the magnitudes between the command value V2 and the value of the signal Vcnt2. Specifically, when the signal Vcnt2 is larger than the command value V2, the comparator circuit 112 outputs a high signal Vc4, and when the signal Vcnt2 is smaller than the command value V2, the comparator circuit 112 outputs a low signal Vc4.

The RS flip-flop 113 receives the signal Vc3 at the input S and the signal Vc4 at the input R. Accordingly, in response to the signal Vc3 going high, the signal Vq2, which is the output Q of the RS flip-flop 113, goes high. Meanwhile, in response to the signal Vc4 going high, the signal Vq2 goes low.

The following describes, as the operation of the power factor correction IC 25a, how the switching control circuits 50 and 51 operate at the same time.

==Operation of Power Factor Correction IC 25a==
<<Operation of Power Factor Correction IC 25a When Ratio R is Equal to Predetermined Ratio>>

Figure 7:
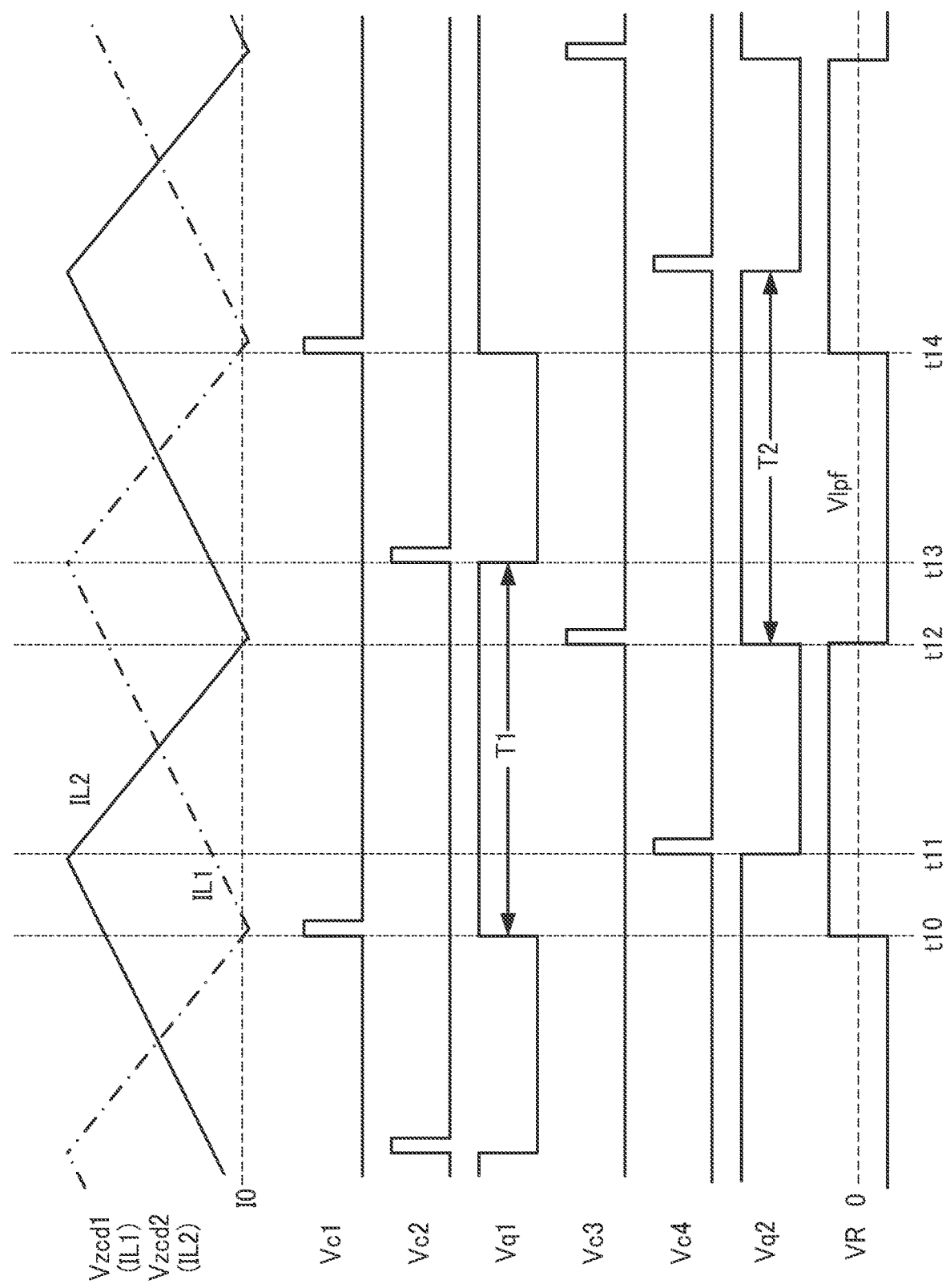

FIG. 7 is a chart illustrating main waveforms of the power factor correction IC 25a. FIG. 7 illustrates the operation of the power factor correction IC 25a when the switching period Tb of the NMOS transistor 26b is equal to the switching period Ta of the NMOS transistor 26a. In this case, it is assumed that the ratio R of the time difference Tθ to the switching period Ta is equal to the predetermined ratio.

At time t10 at which the inductor current IL1 depicted by the dashed-dotted line reaches zero, the comparator circuit 60 in FIG. 3 outputs a high signal Vc1, and thus the switching control circuit 50 outputs a high driving signal Vq1 to turn on the NMOS transistor 26a. In response to the comparator circuit 60 outputting the high signal Vc1, the RS flip-flop 90 outputs a high signal VR.

At time t11 at which the time period T2 has elapsed since the NMOS transistor 26b is turned on before time t10, the comparator circuit 112 in FIG. 6 outputs a high signal Vc4, and thus the switching control circuit 51 outputs a low driving signal Vq2 to turn off the NMOS transistor 26b. In response to turning off of the NMOS transistor 26b, the inductor current IL2 decreases.

At time t12 at which the inductor current IL2 depicted by a solid line reaches zero, the comparator circuit 100 outputs a high signal Vc3, and thus the switching control circuit 51 outputs a high driving signal Vq2 to turn on the NMOS transistor 26b. In response to the comparator circuit 100 outputting the high signal Vc3, the RS flip-flop 90 outputs a low signal VR.

At time t13 at which the time period T1 during which the NMOS transistor 26a is on has elapsed since time t10, the comparator circuit 73 in FIG. 3 outputs a high signal Vc2, and the switching control circuit 50 outputs a low driving signal Vq1 to turn off the NMOS transistor 26a.

At time t14 at which the inductor current IL1 reaches zero, the comparator circuit 60 outputs a high signal Vc1, and thus the switching control circuit 50 outputs a high driving signal Vq1 to turn on the NMOS transistor 26a. In response to the comparator circuit 60 outputting the high signal Vc1, the RS flip-flop 90 outputs a high signal VR.

Since it is assumed in FIG. 7 that the ratio R is equal to the predetermined ratio, the command value Vlpf outputted by the error output circuit 81 is zero as depicted by a dashed line. Accordingly, in this case, the time period T2 is equal to the time period T1.

<<Operation of Power Factor Correction IC 25a When Ratio R is Larger Than Predetermined Ratio>>

Figure 8:
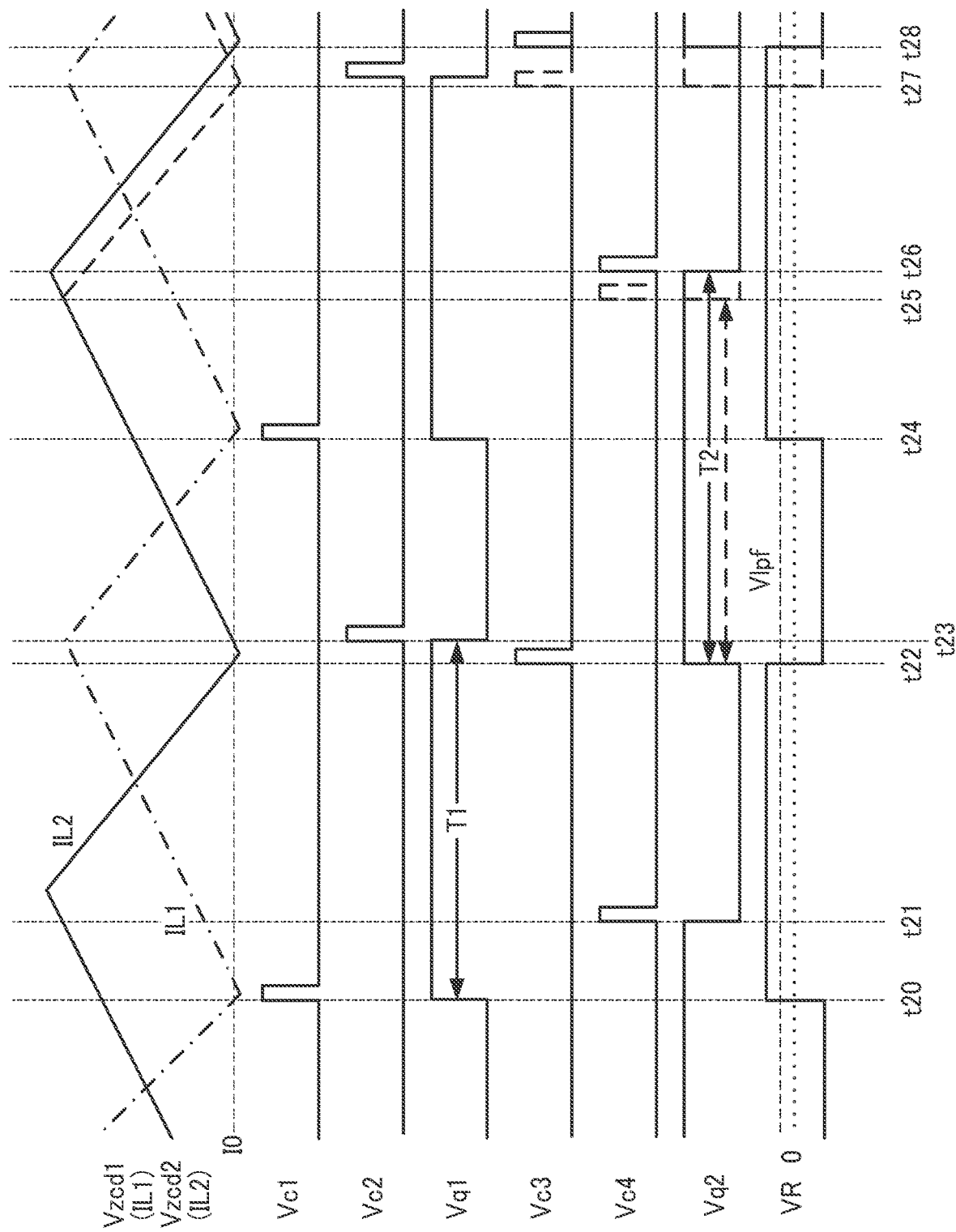

FIG. 8 is a diagram illustrating main waveforms of the power factor correction IC 25a. FIG. 8 illustrates the operation of the power factor correction IC 25a when the switching period Tb of the NMOS transistor 26b is longer than the switching period Ta of the NMOS transistor 26a, and the ratio R of the time difference Tθ to the switching period Ta is larger than the predetermined ratio. The operation from time t20 to time t24 is the same as the operation from time t10 to time t14, and hence a description thereof is omitted.

In FIG. 8, since the ratio R is larger than the predetermined ratio, the command value Vlpf outputted by the error output circuit 81 is a positive value as depicted by a dashed line. In this case, the time period T2 decreases. Accordingly, assuming that, when the command value Vlpf is zero, the NMOS transistor 26b is turned off at time t26 at which the time period T2 has elapsed since time t22, the NMOS transistor 26b is turned off at time t25 because the time period T2 decreases.

Further, the time at which the NMOS transistor 26b is turned off is advanced, which also advances time t27 at which the inductor current IL2 reaches zero, as compared with time t28 at which the inductor current IL2 reaches zero when the time period T2 does not decrease. Accordingly, the switching period Tb of the NMOS transistor 26b decreases, and the ratio R approaches the predetermined ratio. Further, the power factor correction IC 25a makes it possible that the switching frequency of the NMOS transistor 26b follows the change in the switching frequency of the NMOS transistor 26a.

<<Operation of Power Factor Correction IC 25a When Ratio R is Smaller than Predetermined Ratio>>

Figure 9:
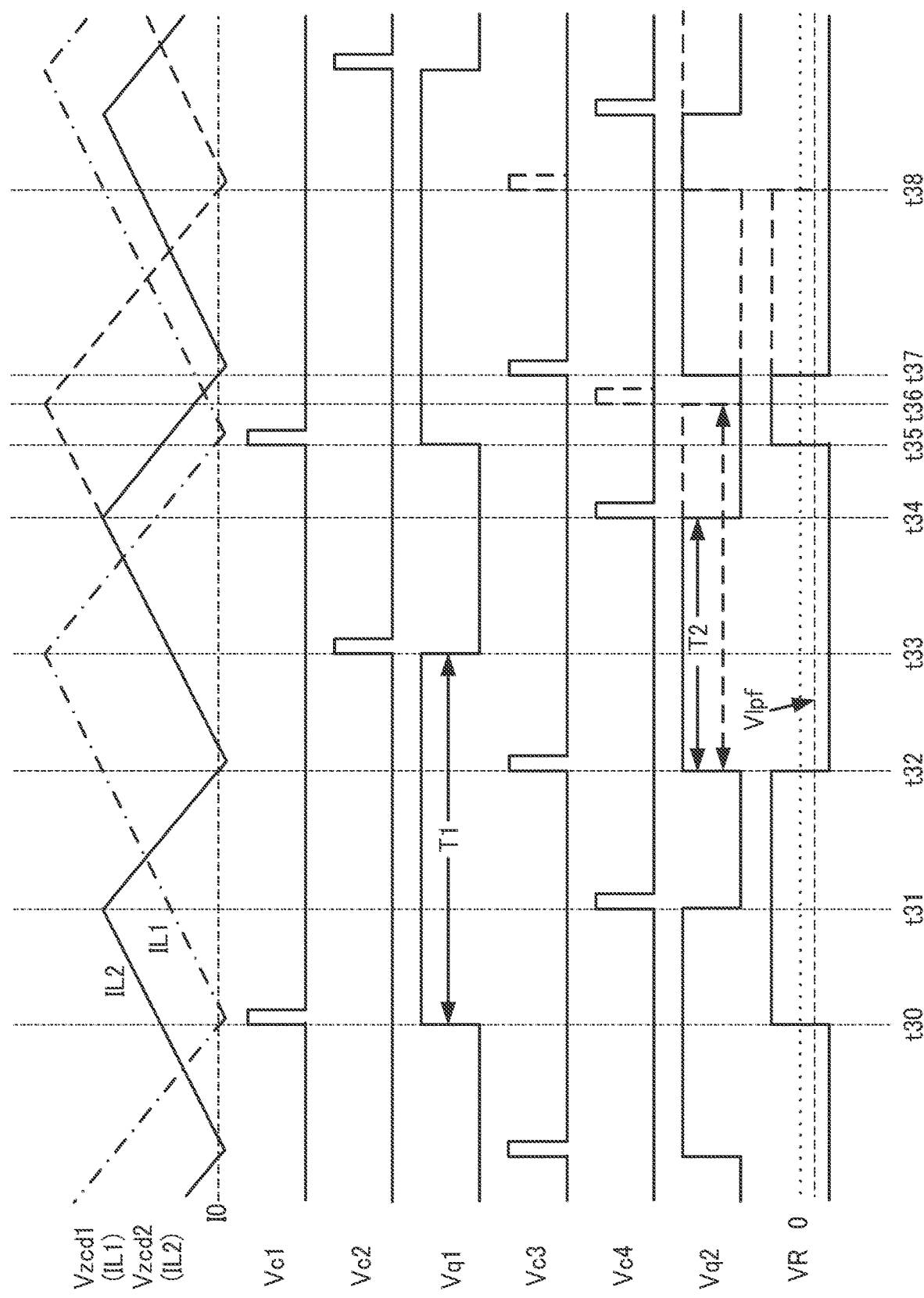

FIG. 9 is a diagram illustrating main waveforms of the power factor correction IC 25a. FIG. 9 illustrates the operation of the power factor correction IC 25a when the switching period of the NMOS transistor 26b is shorter than the switching period of the NMOS transistor 26a, and the ratio R of the time difference Tθ to the switching period Ta is smaller than the predetermined ratio. The operation from time t30 to time t33 is the same as the operation from time t10 to time t13, and hence a description thereof is omitted.

If it is assumed that the command value Vlpf is zero at time t34 at which the time period T2 has elapsed since time t32, the comparator circuit 112 in FIG. 6 outputs a high signal Vc4.

At time t35 at which the inductor current IL1 reaches zero, the comparator circuit 60 in FIG. 3 outputs a high signal Vc1, and thus the switching control circuit 50 outputs a high driving signal Vq1 to turn on the NMOS transistor 26a. Further, in response to the comparator circuit 60 outputting a high signal Vc1, the RS flip-flop 90 outputs a high signal VR.

In FIG. 9, since the ratio R is smaller than the predetermined ratio, the command value Vlpf outputted by the error output circuit 81 is a negative value as depicted by a dashed line. In this case, the time period T2 increases. Accordingly, assuming that, when the command value Vlpf is zero, the NMOS transistor 26b is turned off at time t34 at which the time period T2 has elapsed since time t32, the NMOS transistor 26b is turned off at time t36 because the time period T2 increases.

Further, the time at which the NMOS transistor 26b is turned off is delayed, which also delays time t38 at which the inductor current IL2 reaches zero, as compared with time t37 at which the inductor current IL2 reaches zero assuming that the command value Vlpf is zero. Accordingly, the switching period Tb of the NMOS transistor 26b increases, and the ratio R approaches the predetermined ratio. Further, the power factor correction IC 25a makes it possible that the switching frequency of the NMOS transistor 26b follows the change in the switching frequency of the NMOS transistor 26a.

<<<Simulation Results of Power Factor Correction IC 25a>>>

FIGS. 10A to 10D are charts illustrating simulation results of the power factor correction IC 25a. Here, FIG. 10A illustrates results of the envelope curves of peak values and bottom values of the inductor currents IL1 and IL2. FIG. 10B illustrates the waveforms of the inductor currents IL1 and IL2 when the phase angle of the rectified voltage Vrec is around 0 degrees. FIG. 10C illustrates the waveforms of the inductor currents IL1 and IL2 when the phase angle of the rectified voltage Vrec is around 45 degrees. FIG. 10D illustrates the waveforms of the inductor currents IL1 and IL2 when the phase angle of the rectified voltage Vrec is around 90 degrees. The inductor current IL1 is depicted by dashed-dotted lines, and the inductor current IL2 is depicted by solid lines.

First, with reference to FIG. 10A, the peak-value envelope curves of the inductor currents IL1 and IL2 are substantially the same as the rectified voltage Vrec obtained by full-wave rectifying an AC voltage Vac (e.g., the rectified voltage Vrec illustrated in FIG. 5). This indicates that the power factor correction IC 25a improves the power factor.

Next, with reference to FIG. 10B, since the phase angle of the rectified voltage Vrec is around 0 degrees, the peak values of the inductor currents IL1 and IL2 are small, and the switching frequencies of the NMOS transistors 26a and 26b are high. The intervals between the peak values of the inductor currents IL1 and IL2 are substantially equal (e.g., the intervals of 180 degrees), which indicates that the power factor correction IC 25a maintains an interleaved operation.

Further, with reference to FIG. 10C, the phase angle of the rectified voltage Vrec is around 45 degrees, and thus the peak values of the inductor currents IL1 and IL2 are larger than when the phase angle is around 0 degrees. Hence, the switching frequencies of the NMOS transistors 26a and 26b in FIG. 10C are lower than in FIG. 10B. However, in FIG. 10C as well, the intervals between the peak values of the inductor currents IL1 and IL2 are substantially equal, which indicates that the power factor correction IC 25a maintains the interleaved operation.

Lastly, with reference to FIG. 10D, the phase angle of the rectified voltage Vrec is around 90 degrees, and thus the peak values of the inductor currents IL1 and IL2 are larger than when the phase angle is around 0 degrees and around 45 degrees. Accordingly, the switching frequencies of the NMOS transistors 26a and 26b in FIG. 10D are lower than in FIGS. 10B and 10C. However, in FIG. 10D as well, the intervals between the peak values of the inductor currents IL1 and IL2 are substantially equal, which indicates that the power factor correction IC 25a maintains the interleaved operation.

<<<Simulation Results in the Case in Which Inductance Values are Imbalanced>>>

FIGS. 11A to 11D are charts illustrating simulation results of the power factor correction IC 25a when the inductance values of the primary coils L1a and L1b are imbalanced due to manufacturing variations and/or the like. Here, FIG. 11A illustrates results of the envelope curves of peak values and bottom values of the inductor currents IL1 and IL2. FIG. 11B illustrates the waveforms of the inductor currents IL1 and IL2 when the phase angle of the rectified voltage Vrec is around 0 degrees. FIG. 11C illustrates the waveforms of the inductor currents IL1 and IL2 when the phase angle of the rectified voltage Vrec is around 45 degrees.

Further, FIG. 10D illustrates the waveforms of the inductor currents IL1 and IL2 when the phase angle of the rectified voltage Vrec is around 90 degrees. Note that FIGS. 11A to 11D illustrate the simulation results assuming that the inductance value of the primary coil L2a is 80% of the inductance value of the primary coil L1a. In FIGS. 11A to 11D, the power factor correction IC 25a controls switching of the NMOS transistors 26a and 26b such that the two boost chopper circuits perform an interleaved operation, similarly to the cases in FIGS. 10A to 10D. The inductor current IL1 is depicted by dashed-dotted lines, and the inductor current IL2 is depicted by solid lines.

First, with reference to FIG. 10A, the envelope curves of the peak values of the inductor currents IL1 and IL2 are substantially the same as the rectified voltage Vrec obtained by full-wave rectifying the AC voltage Vac (e.g., the rectified voltage Vrec illustrated in FIG. 5). This indicates, similarly to FIG. 10A, that the power factor correction IC 25a improves the power factor.

Next, with reference to FIG. 11B, the phase angle of the rectified voltage Vrec is around 0 degrees, and thus the peak values of the inductor currents IL1 and IL2 are small, and the switching frequencies of the NMOS transistors 26a and 26b are high as in FIG. 10B. The intervals between the peak values of the inductor currents IL1 and IL2 are substantially equal (e.g., the intervals of 180 degrees), which indicates that the power factor correction IC 25a maintains an interleaved operation. In addition, since the phase angle of the rectified voltage Vrec is around 0 degrees, and the voltage level of the rectified voltage Vrec is low, the difference between the peak values of the inductor currents IL1 and IL2 is small, and the peak values appear to be equal in FIG. 11B.

Further, with reference to FIG. 11C, the phase angle of the rectified voltage Vrec is around 45 degrees, and thus the peak values of the inductor currents IL1 and IL2 are larger than when the phase angle is around 0 degrees, as in FIG. 10C. Accordingly, the switching frequencies of the NMOS transistors 26a and 26b in FIG. 11C are lower than in FIG. 11B. However, in FIG. 11C as well, the intervals between the peak values of the inductor currents IL1 and IL2 are substantially equal, which indicates that the power factor correction IC 25a maintains the interleaved operation.

Since the inductance value of the primary coil L2a is 80% of the inductance value of the primary coil L1a, the inclination of the inductor current IL2 when the NMOS transistor 26b is on is larger than the inclination of the inductor current IL1 when the NMOS transistor 26a is on. Accordingly, even if the NMOS transistors 26a and 26b are on in the same ON period so that the power factor correction IC 25a can perform an interleaved operation, the peak values of the inductor current IL2 are larger than the peak values of the inductor current IL1.

Lastly, with reference to FIG. 11D, since the phase angle of the rectified voltage Vrec is around 90 degrees, the peak values of the inductor currents IL1 and IL2 are larger than when the phase angle is around 0 degrees and around 45 degrees, as in FIG. 10D. Accordingly, the switching frequencies of the NMOS transistors 26a and 26b in FIG. 11D are lower than in FIGS. 11B and 11C. However, in FIG. 11D as well, the intervals between the peak values of the inductor currents IL1 and IL2 are substantially equal, which indicates that the power factor correction IC 25a maintains the interleaved operation. In addition, as in FIG. 11C, the peak values of the inductor current IL2 are larger than the peak values of the inductor current IL1.

As illustrated in FIGS. 11A to 11D, even if the inductance values of the primary coils L1a and L2a are imbalanced, the power factor correction IC 25a can maintain an interleaved operation. However, if there is a difference between the peak values of the inductor currents IL1 and IL2, it causes an imbalance in heat generation between the transformers 23a and 23b. There also occurs an imbalance in heat generation between the NMOS transistors 26a and 26b. The imbalance in the heat generation can sometimes limit the electric power that can be outputted from the AC-DC converter 10. Accordingly, the imbalance in heat generation may be reduced by making the peak values of the inductor currents IL1 and IL2 equal.

OTHER EXAMPLES

<<<Overall Configuration of AC-DC Converter 12>>>

Figure 12:
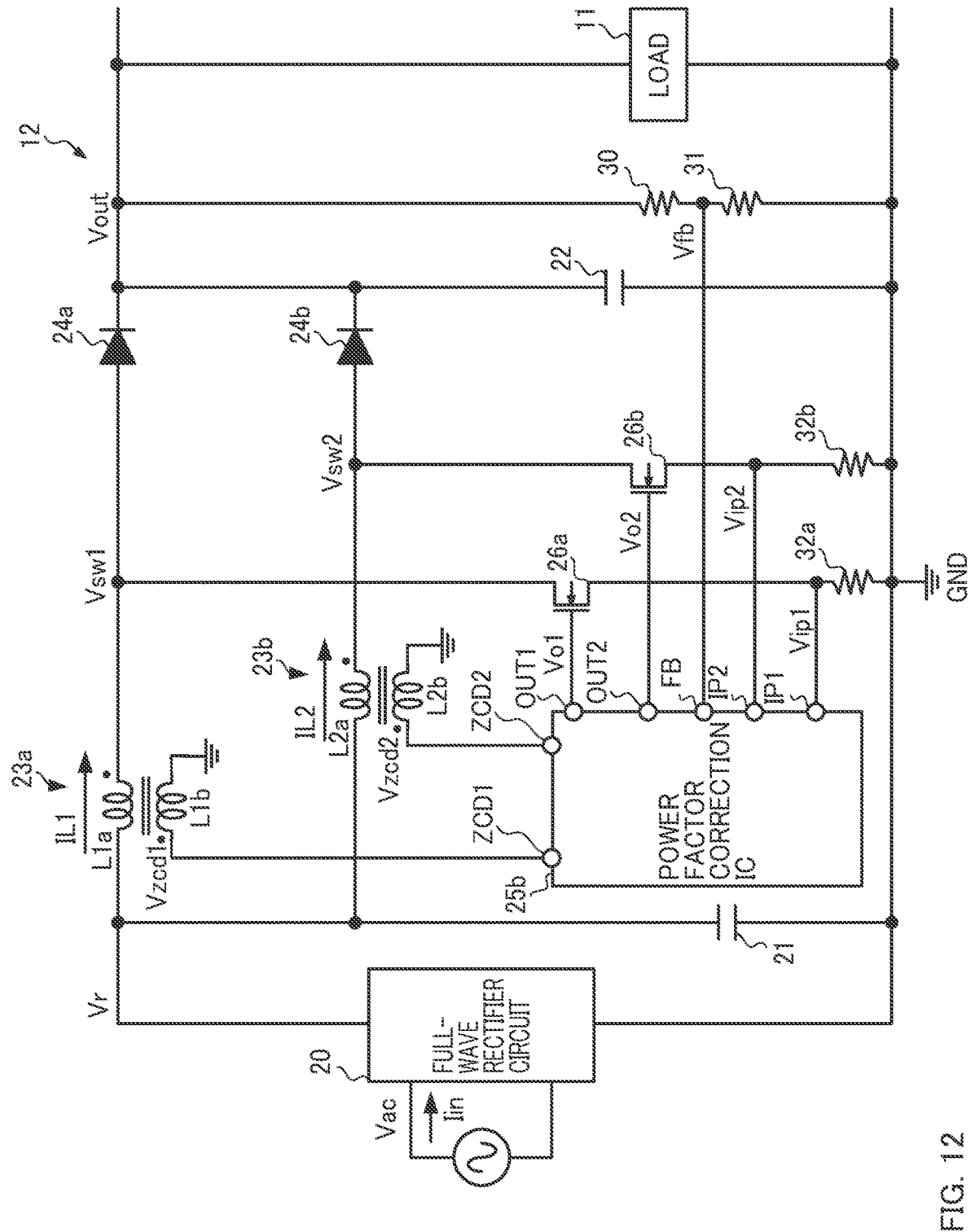
FIG. 12 is a diagram illustrating an example of an AC-DC converter 12.

FIG. 12 is a diagram illustrating an example of an AC-DC converter 12. As with the AC-DC converter 10, the AC-DC converter 12 is a boost PFC circuit configured to generate an output voltage Vout at a target level from an AC voltage Vac of a commercial power supply. The AC-DC converter 12 is a PFC circuit controlled by a power factor correction IC 25b such that the peak values of the inductor currents IL1 and IL2 are equal.

In the AC-DC converter 12, a resistor 32a is provided between the source electrode of the NMOS transistor 26a and the ground, and similarly, a resistor 32b is provided between the source electrode of the NMOS transistor 26b and the ground. A voltage Vip1 generated at the resistor 32a in response to the NMOS transistor 26a being turned on and a current flowing between the drain to the source of the NMOS transistor 26a is applied to a terminal IP1 of the power factor correction IC 25b. Similarly, a voltage Vip2 generated at the resistor 32b in response to the NMOS transistor 26b being turned on and a current flowing between the drain and the source of the NMOS transistor 26b is applied to a terminal IP2 of the power factor correction IC 25b.

<<<Power Factor Correction IC 25b>>>
==Configuration of Power Factor Correction IC 25b==

Figure 13:
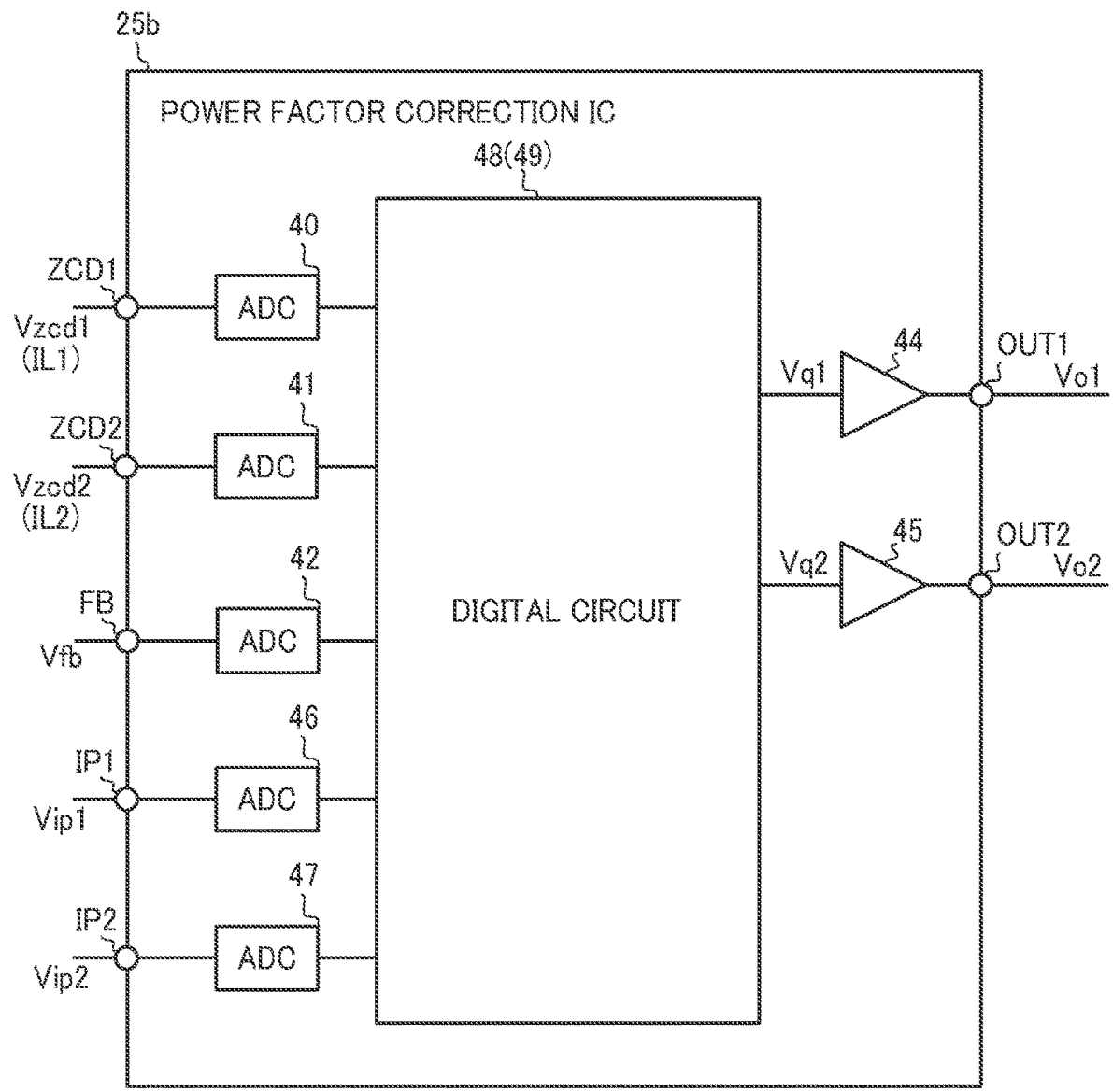
FIG. 13 is a diagram illustrating an example of a power factor correction IC 25b.

FIG. 13 is a diagram illustrating an example of the power factor correction IC 25b. The power factor correction IC 25b includes AD converters 40 to 42, 46, and 47, buffer circuits 44 and 45, and a digital circuit 48.

The AD converter 46 converts the voltage Vip1 into a digital value, and the AD converter 47 converts the voltage Vip2 into a digital value.

The digital circuit 48 is configured to output the driving signals Vq1 and Vq2 to drive the NMOS transistors 26a and 26b, based on the feedback voltage Vfb, and the voltages Vzcd1 and Vzcd2 respectively according to the inductor currents IL1 and IL2, and voltages Vip1 and Vip2. As with the digital circuit 43, the digital circuit 48 is a wired logic circuit configured to perform various types of calculation, and includes, for example, logic gates, flip-flops, and memory. However, the digital circuit 48 may be a digital signal processor (DSP) or a microcomputer.

==Digital Circuit 48==

Figure 14:
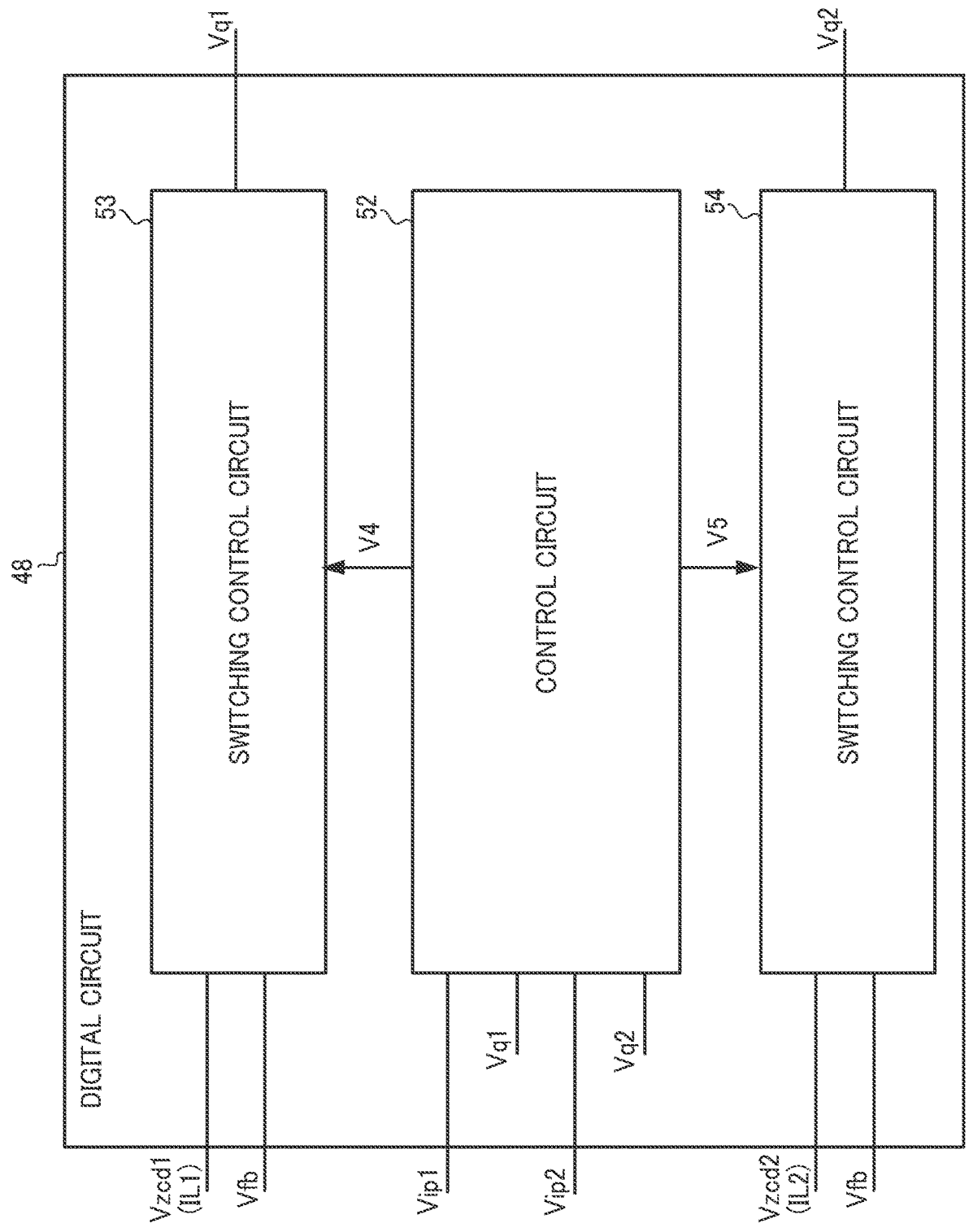
FIG. 14 is a diagram illustrating an example of a digital circuit 48.

FIG. 14 is a diagram illustrating an example of the digital circuit 48 including a circuit configured to cause the inductor currents IL1 and IL2 to have equal peak values. The digital circuit 48 includes a switching control circuit 53 configured to control switching of an NMOS transistor 26a, a switching control circuit 54 configured to control switching of an NMOS transistor 26b, and a control circuit 52 configured to control the switching control circuits 53 and 54.

==Configuration of Control Circuit 52==

Figure 15:
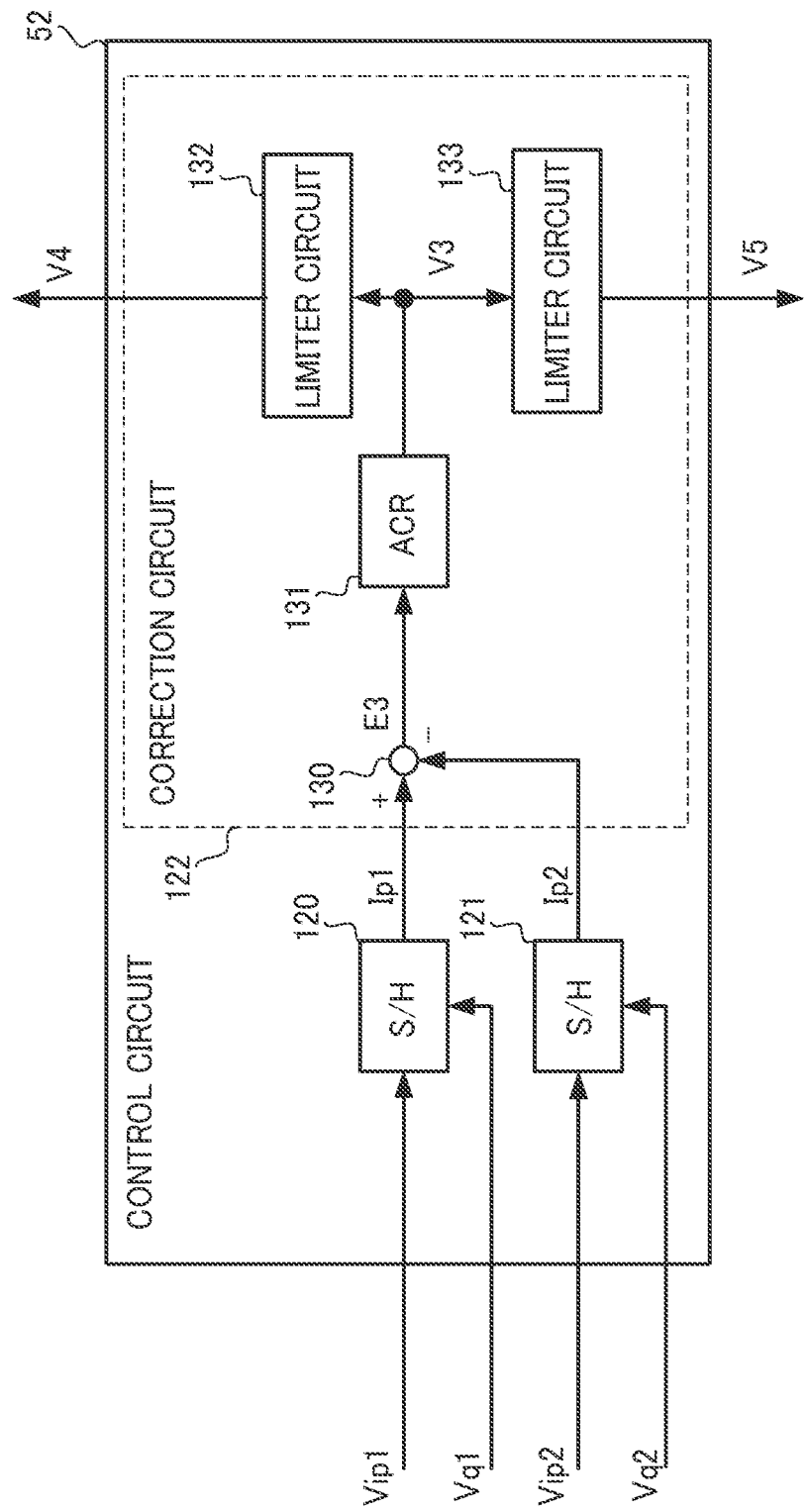
FIG. 15 is a diagram illustrating an example of a control circuit 52.

FIG. 15 is a diagram illustrating an example of the control circuit 52. The control circuit 52 controls the switching control circuits 53 and 54 such that peak values of the inductor currents IL1 and IL2 are equal. Specifically, the control circuit 52 detects the peak value IP1 of the inductor current IL1 and the peak value IP2 of the inductor current IL2, and controls the switching control circuits 53 and 54 so as to reduce the difference between the peak values IP1 and IP2. The following describes assuming that the control circuit 52 receives the voltages Vip1 and Vip2 as digital values. Note that the peak value IP1 corresponds to a "first peak value", and the peak value IP2 corresponds to a "second peak value". The control circuit 52 includes sample-and-hold circuits 120 and 121 and a correction circuit 122.

In response to the driving signal Vq1 going low to turn off the NMOS transistor 26a, the sample-and-hold circuit (S/H) 120 detects the voltage Vip1 as the peak value of the inductor current IL1, to thereby output a resultant as a signal Ip1. Similarly, in response to the driving signal Vq2 going low to turn off the NMOS transistor 26b, the sample-and-hold circuit 121 detects the voltage Vip2 as the peak value of the inductor current IL2, to thereby output a resultant as a signal Ip2. Note that the sample-and-hold circuit 120 corresponds to a "first current detection circuit", and the sample-and-hold circuit 121 corresponds to a "second current detection circuit".

To reduce the difference between the signals Ip1 and Ip2, the correction circuit 122 controls the switching control circuits 53 and 54 so as to correct at least one of the time period T1 during which the NMOS transistor 26a is on or the time period T2 during which the NMOS transistor 26b is on, in response to the signals Ip1 and Ip2. Specifically, the correction circuit 122 corrects the time period T1 so as to be reduced, when the signal Ip1 is larger than the signal Ip2, and corrects the time period T2 so as to be reduced, when the signal Ip2 is larger than the signal Ip1. The correction circuit 122 includes a subtractor circuit 130, an automatic current regulator (ACR) 131, and limiter circuits 132 and 133.

The subtractor circuit 130 detects the difference between the signals Ip1 and Ip2 to compare the magnitudes of the signals Ip1 and Ip2. Specifically, the subtractor circuit 130 subtracts the signal Ip2 from the signal Ip1, to thereby output a resultant as an error E3.

The automatic current regulator 131 outputs a command value V3 such that the signals Ip1 and Ip2 will be equal, according to the error E3. Note that the subtractor circuit 130 and the automatic current regulator 131 in an embodiment of the present disclosure correspond to a so-called error amplifier circuit configured to perform amplification, integration, and the like of the error E3, for example. In addition, although the automatic current regulator 131 is used in an embodiment of the present disclosure, the error E3 may be used as a command value V3.

When the signal Ip1 is larger than the signal Ip2, the limiter circuit 132 outputs a command value V4 to reduce the time period T1 during which the NMOS transistor 26a is on. Specifically, when the signal Ip1 is larger than the signal Ip2, and the automatic current regulator 131 outputs a positive command value V3 according to the error E3, the limiter circuit 132 outputs the command value V4 to correct the time period T1 in accordance with the command value V3.

When the signal Ip2 is larger than the signal Ip1, the limiter circuit 133 outputs a command value V5 to reduce the time period T2 during which the NMOS transistor 26b is on. Specifically, when the signal Ip2 is larger than the signal Ip1, and the automatic current regulator 131 outputs a negative command value V3 according to the error E3, the limiter circuit 133 outputs the command value V5 to correct the time period T2 in accordance with the absolute value of the command value V3.

==Configuration of Switching Control Circuit 53==

Figure 16:
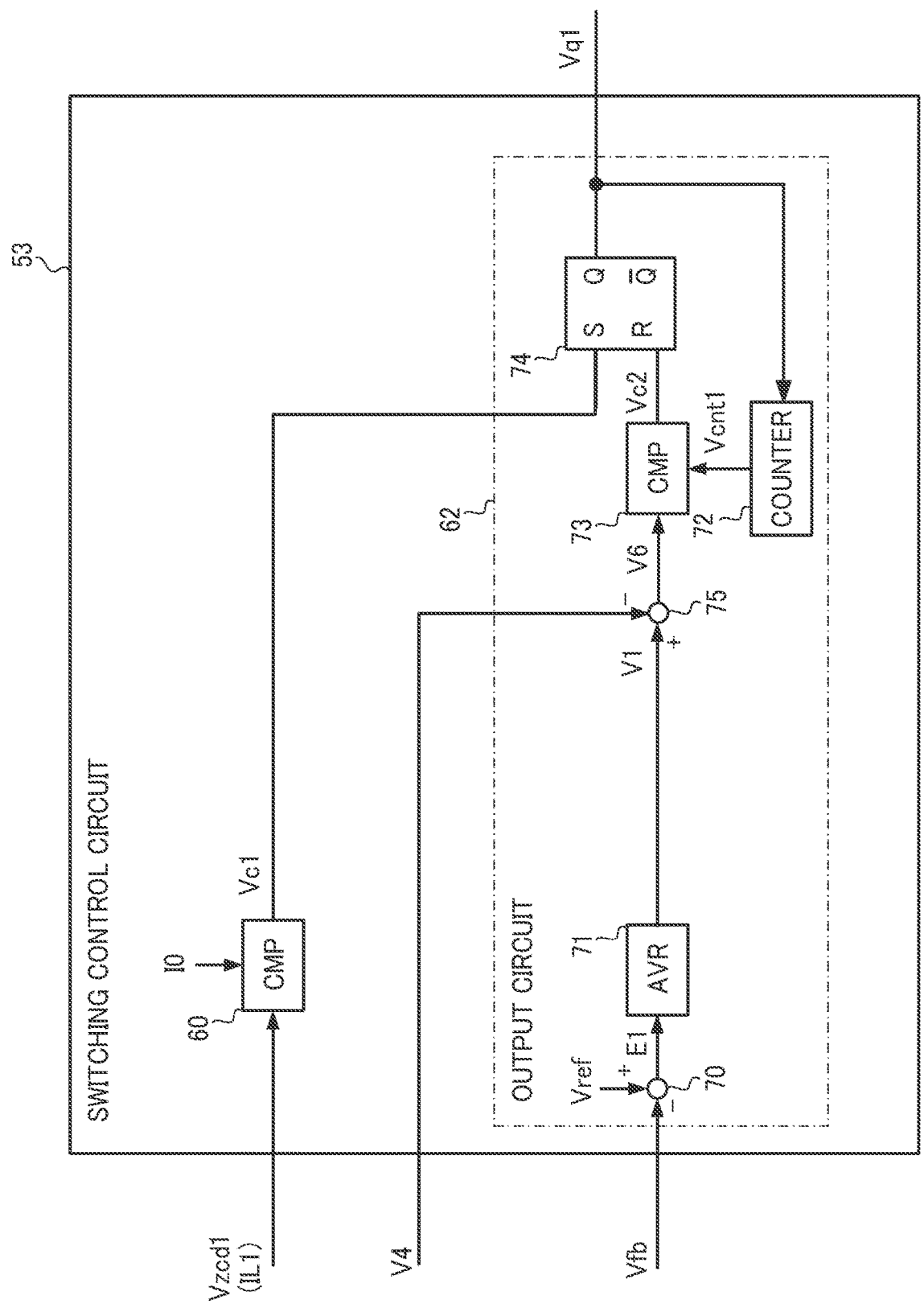
FIG. 16 is a diagram illustrating an example of a switching control circuit 53.

FIG. 16 is a diagram illustrating an example of the switching control circuit 53. The switching control circuit 53 outputs the driving signal Vq1 to control switching of the NMOS transistor 26a, based on the voltage Vzcd1 according to the inductor current IL1, the feedback voltage Vfb, and the command value V4. Specifically, in response to the inductor current IL1 reaching substantially zero, the switching control circuit 53 outputs a driving signal Vq1 to turn on the NMOS transistor 26a. In response to a time period TA shorter than the time period T1 according to the output voltage Vout having elapsed, the switching control circuit 53 outputs a driving signal Vq1 to turn off the NMOS transistor 26a. Note that the time period TA is obtained by reducing the time period T1 according to the command value V4. Note that the switching control circuit 53 corresponds to a "first switching control circuit".

The switching control circuit 53 includes a comparator circuit 60 and an output circuit 62. Note that the following describes assuming that the switching control circuit 53 receives the voltage Vzcd1 as a digital value, the feedback voltage Vfb as a digital value, and the command value V4. Note that the comparator circuit 60 corresponds to a "first-timing detection circuit", and the timing at which the signal Vc1 goes high corresponds to a "fourth timing".

The output circuit 62 outputs the driving signal Vq1 to control switching of the NMOS transistor 26a, based on the signal Vc1, the feedback voltage Vfb, and the command value V4. Specifically, the output circuit 62 outputs a driving signal Vq1 to turn on the NMOS transistor 26a, in response to the signal Vc1 from the comparator circuit 60. Thereafter, in response to the time period TA obtained by reducing the time period T1 according to the command value V4 having elapsed, the output circuit 62 outputs a driving signal Vq1 to turn off the NMOS transistor 26a. Note that the output circuit 62 corresponds to a "first output circuit", and the driving signal Vq1 corresponds to a "first driving signal". The output circuit 62 includes subtractor circuits 70 and 75, an automatic voltage regulator (AVR) 71, a counter 72, a comparator circuit 73, and an RS flip-flop 74. The output circuit 62 is the same as the output circuit 61 except for the subtractor circuit 75, and thus a description of the same components is omitted.

The subtractor circuit 75 outputs a command value V6 indicating the time period TA, in accordance with the command value V1 indicating the time period T1 and the command value V4. Specifically, the subtractor circuit 75 subtracts the command value V4 from the command value V1, to thereby output a resultant as the command value V6.

Then, the comparator circuit 73 compares the magnitudes of the command value V6 indicating the time period TA and the signal Vcnt1, and in response to the signal Vcnt1 exceeding the command value V6, the comparator circuit 73 outputs a high signal Vc2. The RS flip-flop 74 is reset by the high signal Vc2 from the comparator circuit 73, to thereby output a low driving signal Vq1 to turn off the NMOS transistor 26a. Accordingly, when the peak value of the inductor current IL1 is larger than the peak value of the inductor current IL2, the ON period of the NMOS transistor 26a decreases from the time period T1 to the time period TA, and the peak value of the inductor current IL1 decreases.

==Configuration of Switching Control Circuit 54==

Figure 17:
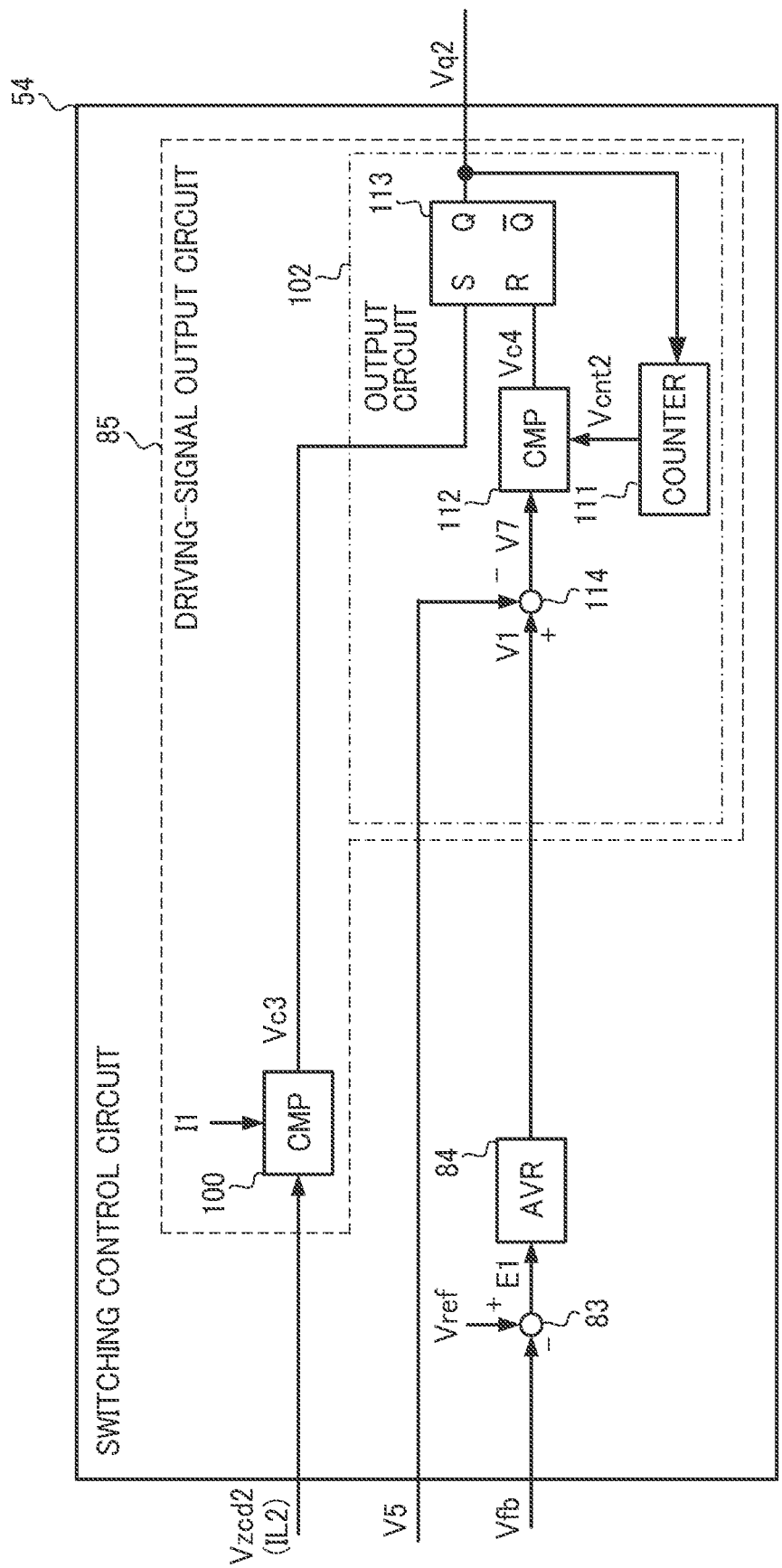
FIG. 17 is a diagram illustrating an example of a switching control circuit 54.

FIG. 17 is a diagram illustrating an example of the switching control circuit 54. The switching control circuit 54 outputs the driving signal Vq2 to control switching of the NMOS transistor 26b, based on the voltage Vzcd2 according to the inductor current IL2, the feedback voltage Vfb, and the command value V5. Specifically, in response to the inductor current IL2 reaching substantially zero, the switching control circuit 54 outputs a driving signal Vq2 to turn on the NMOS transistor 26b. Then, in response to a time period TB shorter than the time period T1 according to the output voltage Vout having elapsed, the switching control circuit 54 outputs a driving signal Vq2 to turn off the NMOS transistor 26b. The time period TB is obtained by reducing the time period T1 according to the command value V5. Note that the switching control circuit 54 corresponds to a "second switching control circuit".

The switching control circuit 54 includes a subtractor circuit 83, an automatic voltage regulator (AVR) 84, and a driving signal output circuit 85. Note that the following describes assuming that the switching control circuit 54 receives the voltage Vzcd2 as a digital value, the feedback voltage Vfb as a digital value, and the command value V5.

The subtractor circuit 83 subtracts the feedback voltage Vfb from a reference voltage Vref serving as a reference for the output voltage Vout at a target level (e.g., 400 V), to thereby calculate an error E1 between the reference voltage Vref and the feedback voltage Vfb.

The automatic voltage regulator 84 outputs, according to the error E1, a command value V1 to cause the level of the feedback voltage Vfb to be equal to the level of the reference voltage Vref. The command value V1 indicates the time period T1. The subtractor circuit 83 and the automatic voltage regulator 84 of an embodiment of the present disclosure correspond to a so-called error amplifier circuit configured to perform amplification, integration, and the like of the error E1, for example. Note that the time period T1 indicated by the command value V1 from the automatic voltage regulator 84 corresponds to a "fourth time period".

The driving signal output circuit 85 outputs the driving signal Vq2 to control switching of the NMOS transistor 26b, based on the voltage Vzcd2 and the command values V1 and V5. Specifically, in response to the inductor current IL2 reaching the current value I1, the driving signal output circuit 85 outputs a driving signal Vq2 to turn on the NMOS transistor 26b. Thereafter, in response to the time period TB shorter than the time period T1 according to the output voltage Vout having elapsed, the driving signal output circuit 85 outputs a driving signal Vq2 to turn off the NMOS transistor 26b. The driving signal output circuit 85 includes a comparator circuit 100 and an output circuit 102.

The output circuit 102 outputs the driving signal Vq2 to control switching of the NMOS transistor 26b, based on the signal Vc3 and the command values V1 and V5. Specifically, the output circuit 102 outputs a driving signal Vq2 to turn on the NMOS transistor 26b, in response to the signal Vc3 from the comparator circuit 100. Thereafter, in response to the time period TB obtained by reducing the time period T1 according to the command value V5 having elapsed, the output circuit 102 outputs a driving signal Vq2 to turn off the NMOS transistor 26b. The output circuit 102 includes a counter 111, a comparator circuit 112, an RS flip-flop 113, and a subtractor circuit 114. The output circuit 102 is substantially the same as the output circuit 101 except for the subtractor circuit 114, and hence a description of the same components is omitted.

The subtractor circuit 114 outputs a command value V7 indicating the time period TB, in accordance with the command value V1 indicating the time period T1 and the command value V5. Specifically, the subtractor circuit 114 subtracts the command value V5 from the command value V1, to output a resultant as the command value V7.

The comparator circuit 112 compares the magnitudes of the command value V7 and the signal Vcnt2, and in response to the signal Vcnt2 exceeding the command value V7, the comparator circuit 112 outputs a high signal Vc4. The RS flip-flop 113 is reset by the high signal Vc4 from the comparator circuit 112, to thereby output a low driving signal Vq2 to turn off the NMOS transistor 26b. Accordingly, when the peak value of the inductor current IL2 is larger than the peak value of the inductor current IL1, the ON period of the NMOS transistor 26b decreases from the time period T2 to the time period TB, and the peak value of the inductor current IL2 decreases.

==Operation of Power Factor Correction IC 25b==

Figure 18:
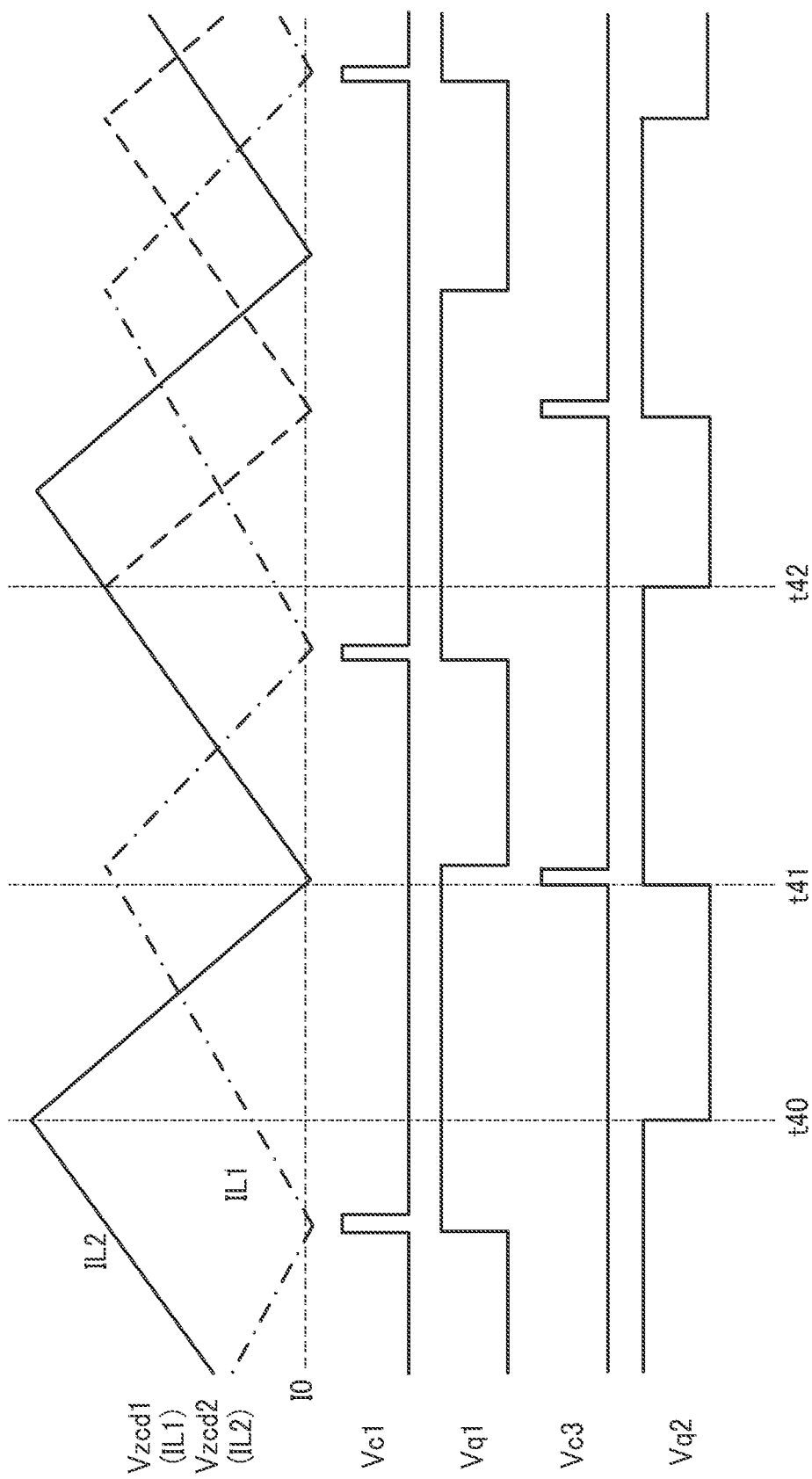
FIG. 18 is a chart illustrating an example of main waveforms of a power factor correction IC 25b including a digital circuit 48.

FIG. 18 is a chart illustrating an example of main waveforms of the power factor correction IC 25b. FIG. 18 illustrates a case in which the signal Ip2 indicating the peak value of the inductor current IL2 depicted by a solid line is larger than the signal Ip1 indicating the peak value of the inductor current IL1 depicted by a dashed-dotted line, before time t40. The following describes the operation of the switching control circuit 54 in which the time period T1 is corrected because the signal Ip2 is larger than the signal Ip1. It is assumed that the NMOS transistors 26a and 26b have been turned on before time t40. Before time t40, the peak value of the inductor current IL2 is larger than the peak value of the inductor current IL1, and thus the automatic current regulator 131 in FIG. 15 outputs a negative command value V3, and the correction circuit 122 has outputted the command value V5 to correct the switching control circuit 54. Thus, from time t40, the switching control circuit 54 performs switching of the NMOS transistor 26b, with the time period TB obtained by reducing the time period T1 in accordance with the command value V5 being used as the ON period.

Further, FIG. 18 illustrates, with a dashed line, how the inductor current IL2 changes after time t41 as a result of the operation of the control circuit 52 of the power factor correction IC 25b. FIG. 18 also illustrates the driving signal Vq2 to switch the NMOS transistor 26b such that the inductor current IL2 depicted by the dashed line is generated, after time t41.

At time t40 at which the time period T1 has elapsed since the NMOS transistor 26b is turned on before time t40, the switching control circuit 54 outputs a low driving signal Vq2 to turn off the NMOS transistor 26b. Then, the inductor current IL2 starts decreasing.

At time t41 at which the inductor current IL2 decreases to the current value I1, the comparator circuit 100 outputs a high signal Vc3. Then, the output circuit 102 outputs a high driving signal Vq2 to turn on the NMOS transistor 26b. The subtractor circuit 114 subtracts the command value V5 from the command value V1 indicating the time period T1, to thereby output the command value V7 indicating the time period TB.

At time t42 at which the time period TB has passed since time t41, the signal Vcnt2 exceeds the command value V7, and the comparator circuit 112 outputs a high signal Vc4. Thus, the output circuit 102 outputs a low driving signal Vq2 to turn off the NMOS transistor 26b. The same or a similar operation is repeated therefrom. Accordingly, the signal Ip2 indicating the peak value of the inductor current IL2 becomes equal to the signal Ip1 indicating the peak value of the inductor current IL1.

==Digital Circuit 49==

Figure 19:
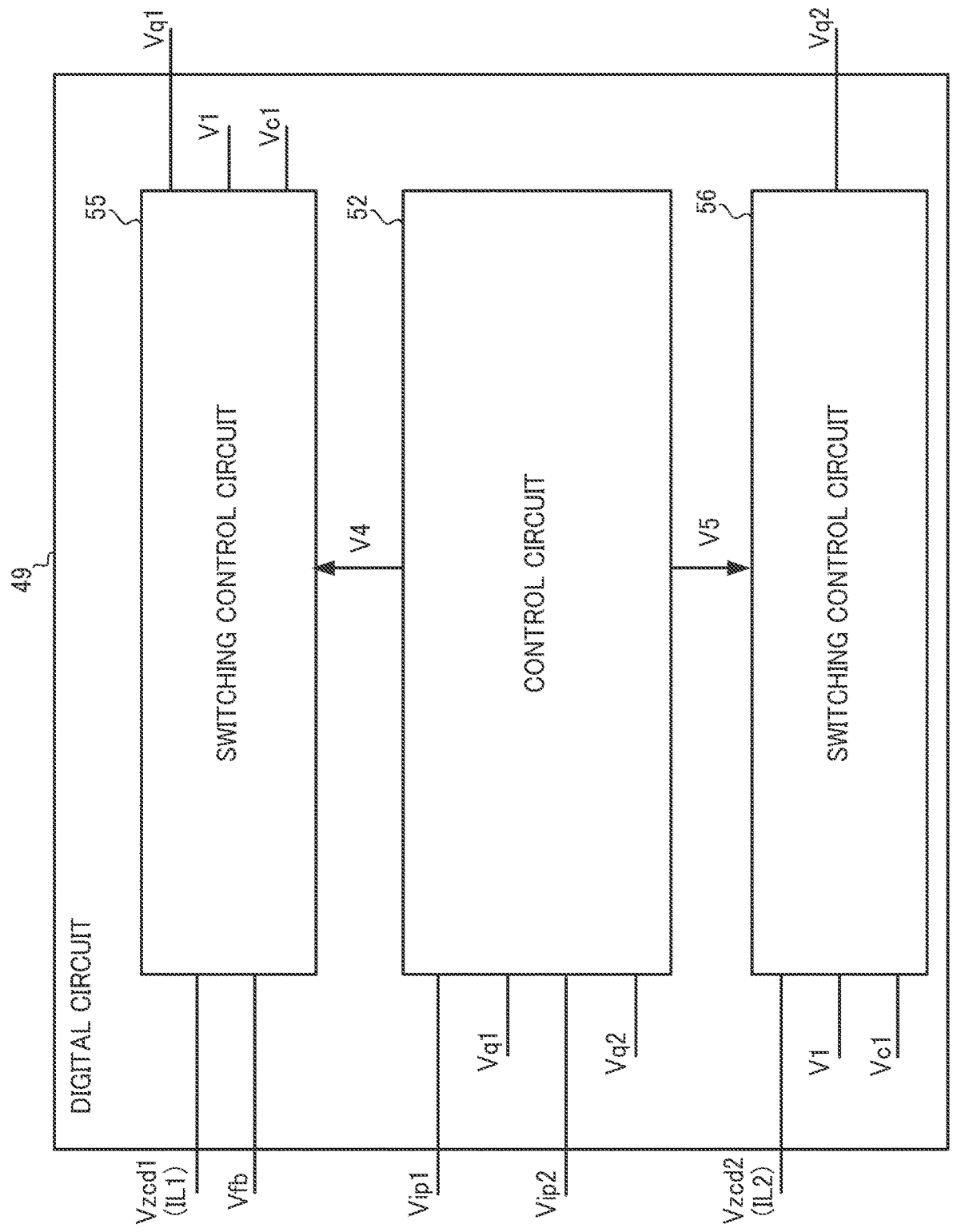
FIG. 19 is a diagram illustrating an example of a digital circuit 49.

FIG. 19 is a diagram illustrating an example of a digital circuit 49, which is a modification example of the digital circuit 48 including a circuit configured to cause the inductor currents IL1 and IL2 to have equal peak values. The digital circuit 49 of an embodiment of the present disclosure includes a control circuit 52, a switching control circuit 55, and a switching control circuit 56.

==Configuration of Switching Control Circuit 55==

Figure 20:
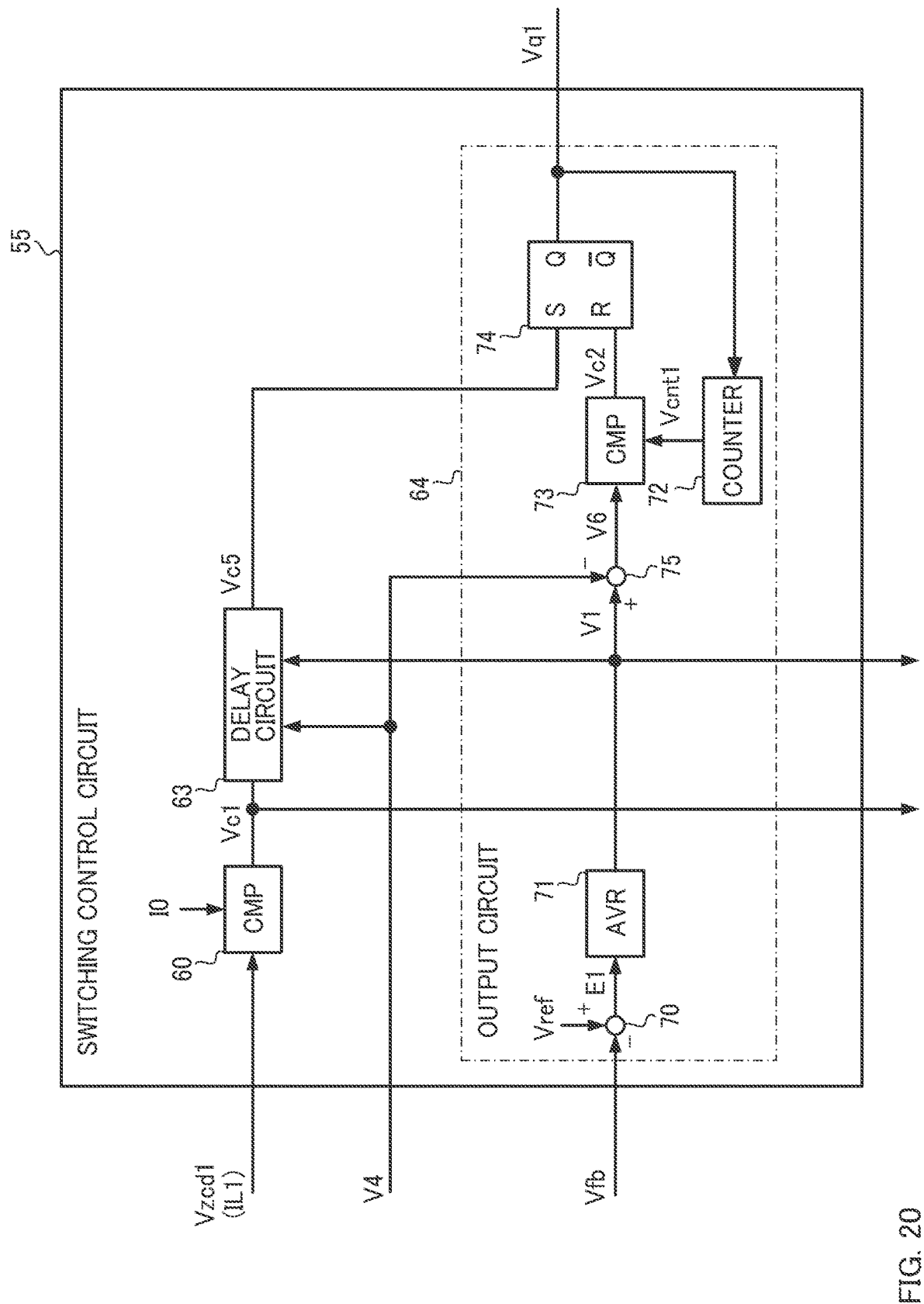
FIG. 20 is a diagram illustrating an example of a switching control circuit 55.

FIG. 20 is a diagram illustrating an example of the switching control circuit 55. The switching control circuit 55 delays the timing at which the NMOS transistor 26a is turned on, according to the command value V4 from the control circuit 52 such that the peak values of the inductor currents IL1 and IL2 will be equal while an interleaved operation is maintained. The switching control circuit 55 outputs the driving signal Vq1 to control switching of the NMOS transistor 26a, based on the voltage Vzcd1 according to the inductor current IL1, the feedback voltage Vfb, and the command value V4. Specifically, after the inductor current IL1 reaches substantially zero, the switching control circuit 55 outputs a driving signal Vq1 to turn on the NMOS transistor 26a. Further, in response to the time period TA shorter than the time period T1 according to the output voltage Vout having elapsed, the switching control circuit 55 outputs a driving signal Vq1 to turn off the NMOS transistor 26a. Note that the time period TA is obtained by reducing the time period T1, according to the command value V4.

The switching control circuit 55 includes a comparator circuit 60, a delay circuit 63, and an output circuit 64. Note that the following describes assuming that the switching control circuit 55 receives the voltage Vzcd1 as a digital value, the feedback voltage Vfb as a digital value, and the command value V4. As compared with the switching control circuit 53, the switching control circuit 55 additionally includes a delay circuit 63 configured to delay the timing at which the NMOS transistor 26a is turned on according to the command value V4 from the control circuit 52.

The delay circuit 63 is configured to delay the timing at which the NMOS transistor 26a is turned on so that the peak values of the inductor currents IL1 and IL2 will be equal while an interleaved operation of the two chopper circuits is maintained. Specifically, the delay circuit 63 delays, based on the command value V4 from the correction circuit 122, the signal Vc1 from the comparator circuit 60 indicating the timing at which the NMOS transistor 26a is turned on, by the time period indicating the difference between the time period T1 and the time period TA determined according to the difference between the signals Ip1 and Ip2 (i.e., the command value V4), to thereby output a resultant as a signal Vc5. Note that the delay circuit 63 corresponds to a "first delay circuit".

Note that the delay circuit 63 may further delay the signal Vc1 until a time point after a lapse of an odd multiple of a half period of the resonant period of the inductor current IL1 that flows while resonating after the NMOS transistor 26a is turned off, to thereby output a resultant as the signal Vc5.

Further, the output circuit 64 outputs a driving signal Vq1 to turn on the NMOS transistor 26a in response to the signal Vc5 from the delay circuit 63. Thereafter, in response to the time period TA having elapsed, the output circuit 64 outputs a driving signal Vq1 to turn off the NMOS transistor 26a.

==Configuration of Switching Control Circuit 56==

Figure 21:
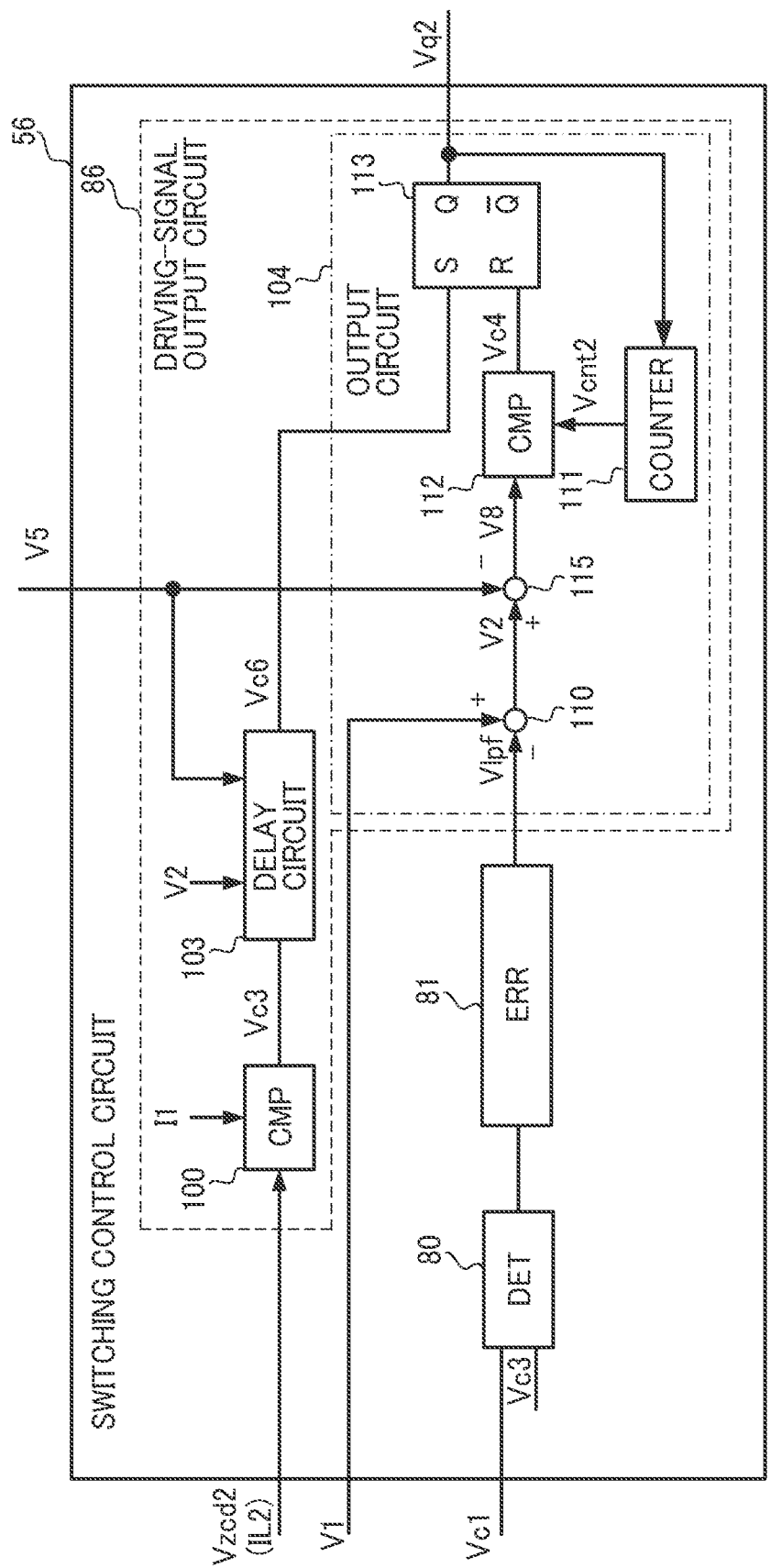
FIG. 21 is a diagram illustrating an example of a switching control circuit 56.

FIG. 21 is a diagram illustrating an example of the switching control circuit 56. The switching control circuit 56 delays the timing at which the NMOS transistor 26b is turned on according to the command value V5 from the control circuit 52, to maintain the interleaved operation. The switching control circuit 56 outputs the driving signal Vq2 to control switching of the NMOS transistor 26b, based on the voltage Vzcd2 according to the inductor current IL2, the feedback voltage Vfb, the signal Vc1, and the command value V5.

Specifically, the switching control circuit 56 outputs a driving signal Vq2 to turn on the NMOS transistor 26b, after the inductor current IL2 reaches substantially zero. Further, in response to a time period T3, which is shorter than the time period T2 according to the command value V1 from the switching control circuit 55, the switching period Ta of the NMOS transistor 26a, and the time difference Tθ, having elapsed, the switching control circuit 56 outputs a driving signal Vq2 to turn off the NMOS transistor 26b. The time period T3 is obtained by reducing the time period T2 according to the command value V5. Note that the time period T3 corresponds to a "third time period".

The switching control circuit 56 includes a detection circuit 80, an error output circuit 81, and a driving signal output circuit 86. Note that the following describes assuming that the switching control circuit 56 receives the voltage Vzcd2 as a digital value, the signal Vc1, and the command values V1 and V5. Note that the switching control circuit 56 corresponds to a "switching control circuit" configured to cause the inductor currents IL1 and IL2 to have equal peak values while maintaining an interleaved operation.

The driving signal output circuit 86 outputs the driving signal Vq2 to control switching of the NMOS transistor 26b, based on the voltage Vzcd2 and the command values V1, V5, and Vlpf. Specifically, the driving signal output circuit 86 outputs a driving signal Vq2 to turn on the NMOS transistor 26b, after the inductor current IL2 reaches the current value I1. Thereafter, in response to the time period T3 shorter than the time period T2 according to the command values V1 and Vlpf having elapsed, the driving signal output circuit 86 outputs a driving signal Vq2 to turn off the NMOS transistor 26b. The driving signal output circuit 86 includes a comparator circuit 100, a delay circuit 103, and an output circuit 104. Note that, as compared with the driving signal output circuit 85, the driving signal output circuit 86 additionally includes a delay circuit 103 configured to delay the timing at which the NMOS transistor 26b is turned on, according to the command value V5 from the control circuit 52.

The delay circuit 103 is configured to delay the timing at which the NMOS transistor 26b is turned on so that the peak values of the inductor currents IL1 and IL2 will be equal while the interleaved operation of the two chopper circuits is maintained. Specifically, the delay circuit 103 delays, based on the command value V5 from the correction circuit 122, the signal Vc3 from the comparator circuit 100 indicating the timing at which the NMOS transistor 26b is turned on, by the difference between the time period T2 and the time period T3 determined according to the difference between the signals Ip1 and Ip2 (i.e., the command value V5), to output a resultant as a signal Vc6. Note that the comparator circuit 100 corresponds to a "timing detection circuit", and the timing at which the signal Vc3 goes high corresponds to a "third timing". The delay circuit 103 corresponds to a "delay circuit".

Note that the delay circuit 103 may further delay the signal Vc3 until a time point after a lapse of an odd multiple of a half period of the resonant period of the inductor current IL2 that flows while resonating after the NMOS transistor 26b is turned off, to thereby output a resultant as the signal Vc6.

The output circuit 104 outputs the driving signal Vq2 to control switching of the NMOS transistor 26b in response to the signal Vc6 and the command values V1, V5, and Vlpf. Specifically, the output circuit 104 outputs a driving signal Vq2 to turn on the NMOS transistor 26b, in response to the signal Vc6 from the delay circuit 103. Thereafter, in response to the time period T3 having elapsed, the output circuit 104 outputs a driving signal Vq2 to turn off the NMOS transistor 26b. Note that the output circuit 104 corresponds to an "output circuit". The output circuit 104 includes subtractor circuits 110 and 115, a counter 111, a comparator circuit 112, and an RS flip-flop 113.

The subtractor circuit 115 outputs the time period T3 in accordance with the time period T2 and the command value V5. Specifically, the subtractor circuit 115 subtracts the command value V5 from the command value V2 indicating the time period T2, to thereby output a command value V8 indicating the time period T3.

The comparator circuit 112 compares the magnitudes of the command value V8 and the signal Vcnt2, and in response to the signal Vcnt2 exceeding the command value V8, the comparator circuit 112 outputs a high signal Vc4. The RS flip-flop 113 is reset by the high signal Vc4 from the comparator circuit 112, to thereby output a low driving signal Vq2 to turn off the NMOS transistor 26b. Accordingly, when the peak value of the inductor current IL2 is larger than the peak value of the inductor current IL1, the ON period of the NMOS transistor 26b decreases from the time period T2 to the time period T3, and the peak value of the inductor current IL2 decreases. At the same time, since the timing at which the NMOS transistor 26b is turned on is delayed, the timing at which the inductor current IL2 reaches zero next time is delayed, which makes it more likely to maintain the interleaved operation.

<<Operation of Power Factor Correction IC 25b When Two Chopper Circuits Perform Interleaved Operation>>

Figure 22:
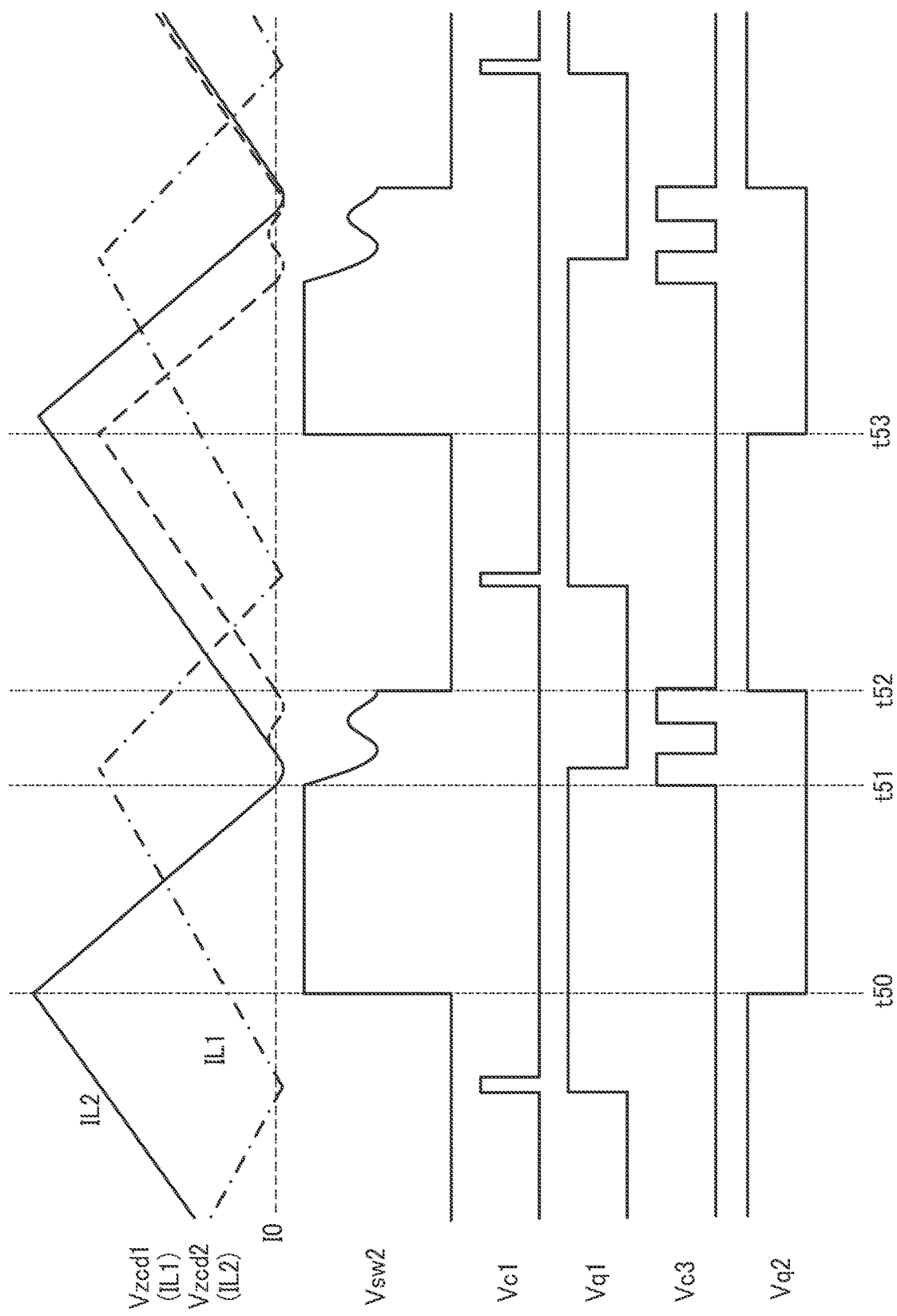
FIG. 22 is a chart illustrating an example of main waveforms of a power factor correction IC 25b including a digital circuit 49.

FIG. 22 is a chart illustrating an example of main waveforms of the power factor correction IC 25b. FIG. 22 illustrates a case in which the signal Ip2 indicating the peak value of the inductor current IL2 depicted by a solid line is larger than the signal Ip1 indicating the peak value of the inductor current IL1 depicted by a dashed-dotted line before time t50. Further, it is assumed that the NMOS transistors 26a and 26b are turned on, before time t50. FIG. 22 illustrates assuming that the delay circuit 103 delays the signal Vc3, based on the command value V2 indicating the time period T2, the command value V5, and the resonant period, to thereby output a resultant as the signal Vc6. In this case, the power factor correction IC 25b controls switching of the NMOS transistor 26b so as to perform a so-called bottom-skip operation.

It is assumed that the NMOS transistors 26a and 26b are turned on before time t50. Before time t50, the peak value of the inductor current IL2 is larger than the peak value of the inductor current IL1, and thus the automatic current regulator 131 in FIG. 15 outputs a negative command value V3, and the correction circuit 122 outputs the command value V5 to correct the switching control circuit 56. Thus, from time t50, the switching control circuit 56 performs switching of the NMOS transistor 26b, with the time period T3 obtained by reducing the time period T2 in accordance with the command value V6 being used as the ON period.

Further, FIG. 22 illustrates, with a dashed line, how the inductor current IL2 changes after time t51 as a result of the operation of the control circuit 52 of the power factor correction IC 25b. FIG. 22 also illustrates the driving signal Vq2 to switch the NMOS transistor 26b such that the inductor current IL2 depicted by the dashed line is generated, from time t51.

At time t50 at which the time period T2 has elapsed since the NMOS transistor 26b is turned on before time t50, the switching control circuit 56 outputs a low driving signal Vq2 to turn off the NMOS transistor 26b. Then, the inductor current IL2 starts decreasing.

At time t51 at which the inductor current IL2 decreases to the current value I0, the comparator circuit 100 outputs a high signal Vc3. Thereafter, the delay circuit 103 delays the signal Vc3 by the difference between the time period T3 determined according to the command value V5 and the time period T2.

After the delay circuit 103 delays the signal Vc3 by the difference between the time period T3 and the time period T2, the switching control circuit 56 outputs a high driving signal Vq2 to turn on the NMOS transistor 26b, at time t52 at which the comparator circuit 100 changes the signal Vc3 to low. Note that time t52 corresponds to a time point after a lapse of an odd multiple of the half period of the resonant period of the inductor current IL2 flowing while resonating after the NMOS transistor 26b is turned off, which is a timing at which the direction in which the inductor current IL2 flows changes from a negative direction to a positive direction. The subtractor circuit 115 subtracts the command value V5 from the command value V2 indicating the time period T2, to thereby output the command value V8 indicating the time period T3.

At time t53 at which the time period T3 has elapsed since time t52, the signal Vcnt2 exceeds the command value V8, and the comparator circuit 112 outputs a high signal Vc4. Thus, the output circuit 104 outputs a low driving signal Vq2 to turn off the NMOS transistor 26b. The same or a similar operation is repeated from time t53. Accordingly, the signal Ip2 indicating the peak value of the inductor current IL2 becomes equal to the signal Ip1 indicating the peak value of the inductor current IL1. Further, the interleaved operation is also maintained.

<<<Simulation Results of Power Factor Correction IC 25b>>>

FIGS. 23A to 23D are charts illustrating simulation results of the power factor correction IC 25b when the inductance values of the primary coils L1a and L1b are imbalanced due to manufacturing variations and/or the like. Here, FIG. 23A illustrates results of the envelope curves of peak values and bottom values of the inductor currents IL1 and IL2. FIG. 23B illustrates the waveforms of the inductor currents IL1 and IL2 when the phase angle of the rectified voltage Vrec is around 0 degrees. FIG. 23C illustrates the waveforms of the inductor currents IL1 and IL2 when the phase angle of the rectified voltage Vrec is around 45 degrees. FIG. 23D illustrates the waveforms of the inductor currents IL1 and IL2 when the phase angle of the rectified voltage Vrec is around 90 degrees. The inductor current IL1 is depicted by dashed-dotted lines, and the inductor current IL2 is depicted by solid lines.

First, with reference to FIG. 23A, the peak-value envelope curves of the inductor currents IL1 and IL2 are substantially matched with the rectified voltage Vrec obtained by full-wave rectifying the AC voltage Vac (e.g., the rectified voltage Vrec illustrated in FIG. 5). This indicates that the power factor correction IC 25b improves the power factor.

Next, with reference to FIG. 23B, since the phase angle of the rectified voltage Vrec is around 0 degrees, the peak values of the inductor currents IL1 and IL2 are small. The intervals between the peak values of the inductor currents IL1 and IL2 are substantially equal (e.g., the intervals of 180 degrees), which indicates that the power factor correction IC 25b maintains an interleaved operation. In FIG. 23B, since the ON period of each of the NMOS transistors 26a and 26b is short, the peak values of the inductor currents IL1 and IL2 are small. Hence, even though the inductance values of the primary coils L1a and L2a are imbalanced, the difference between the peak values is small. Accordingly, the difference between the time period T3 and the time period T2 is small, and the delay of the ON timing of the NMOS transistor 26b caused by the delay of the delay circuit 103 is not noticeable.

With reference to FIG. 23C illustrating the operation when the phase angle of the rectified voltage Vrec is around 45 degrees, the ON period of each of the NMOS transistors 26a and 26b in FIG. 23C is longer than in FIG. 23B. Then, since the peak values of the inductor currents IL1 and IL2 are relatively large, the difference between the peak values should be large as a result of an imbalance between the inductance values of the primary coils L1a and L2a. Accordingly, the difference between the time period T3 and the time period T2 is large, and the delay of the ON timing of the NMOS transistor 26b caused by the delay of the delay circuit 103 is large. In this case, the power factor correction IC 25b causes the boost chopper circuit including the NMOS transistor 26b to perform a discontinuous operation such that the peak values become equal. This results in the peak values of the inductor currents IL1 and IL2 being equal. Further, the power factor correction IC 25b maintains the interleaved operation.

Lastly, with reference to FIG. 23D illustrating the operation when the phase angle of the rectified voltage Vrec is around 90 degrees, the ON period of each of the NMOS transistors 26a and 26b in FIG. 23D is long, as in FIG. 23C, and the difference between the peak values of the inductor currents IL1 and IL2 is large. However, the power factor correction IC 25b causes the boost chopper circuit including the NMOS transistor 26b to perform a discontinuous operation such that the peak values become equal. This results in the peak values of the inductor currents IL1 and IL2 being equal. Further, the power factor correction IC 25b maintains the interleaved operation.

<<<Example of Modification of Power Factor Correction IC 25a>>>

Figure 24:
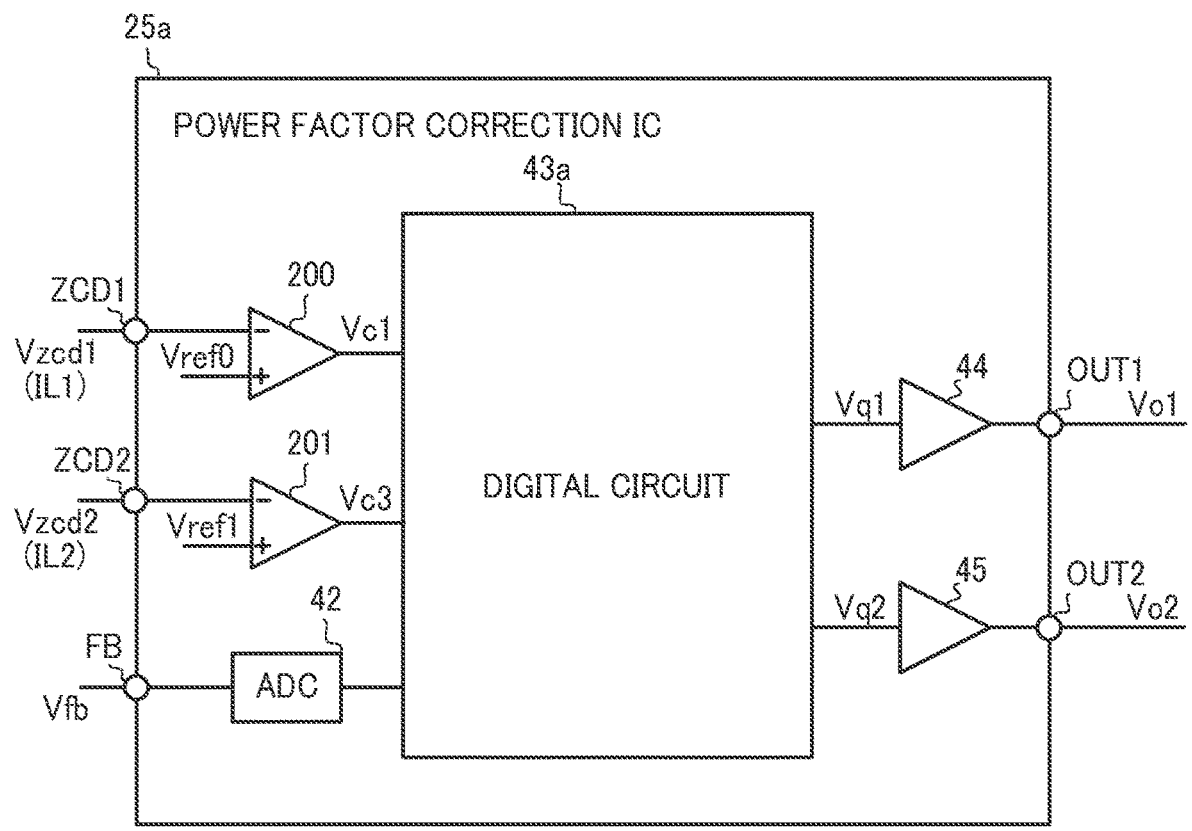

FIG. 24 is a diagram illustrating an example of a modification of the power factor correction IC 25a. In the power factor correction IC 25a, the AD converter 40 in FIG. 2 converts the voltage Vzcd1 into a digital value, and then the comparator circuit 60 in FIG. 3 compares the voltage Vzcd1 with a digital value according to the current value I0, to thereby output a resultant as the signal Vc1. Similarly, the AD converter 41 in FIG. 2 converts the voltage Vzcd2 into a digital value, and then the comparator circuit 100 in FIG.

6 compares the voltage Vzcd2 with a digital value corresponding to the current value I1, to thereby output a resultant as the signal Vc3.

Meanwhile, the modification example of the power factor correction IC 25a includes analog comparator circuits 200 and 201 instead of the AD converters 40 and 41 in FIG. 2, and includes a digital circuit 43a instead of the digital circuit 43.

The comparator circuit 200 compares the voltage Vzcd1 with a reference voltage Vref0 according to the current value I0, and when the voltage Vzcd1 is lower than the reference voltage Vref0, the comparator circuit 200 outputs a high signal Vc1. When the voltage Vzcd1 is higher than the reference voltage Vref0, the comparator circuit 200 outputs a low signal Vc1.

Similarly, the comparator circuit 201 compares the voltage Vzcd2 with a reference voltage Vref1 according to the current value I1, and when the voltage Vzcd2 is lower than the reference voltage Vref1, the comparator circuit 201 outputs a high signal Vc3. When the voltage Vzcd2 is higher than the reference voltage Vref1, the comparator circuit 201 outputs a low signal Vc3.

The digital circuit 43a performs an operation that is the same as or similar to that of the digital circuit 43, in response to the signal Vc1 from the comparator circuit 200 and the signal Vc3 from the comparator circuit 201. As described above, the modification example of the power factor correction IC 25a has a configuration in which the AD converter 40 and the comparator circuit 60 of the power factor correction IC 25a are replaced with the comparator circuit 200, and the AD converter 41 and the comparator circuit 100 of the power factor correction IC 25a are replaced with the comparator circuit 201.

Note that in the case of the power factor correction IC 25a, the AD converters 40 and 41 need sampling intervals capable of capturing instantaneous values of switching waveforms that reach several hundred kHz at the highest, and thus need a sampling frequency of several MHz at the lowest. However, modifying the power factor correction IC 25a as described above eliminates the need for a sampling frequency of several MHz, thereby being able to reduce the area of the power factor correction IC 25a and the power consumption of the integrated circuit.

Although FIG. 24 illustrates the power factor correction IC 25a as an example, the same or a similar modification can be also applied to the power factor correction IC 25b.

<<<Overview of AC-DC Converter 13>>>

Figure 25:
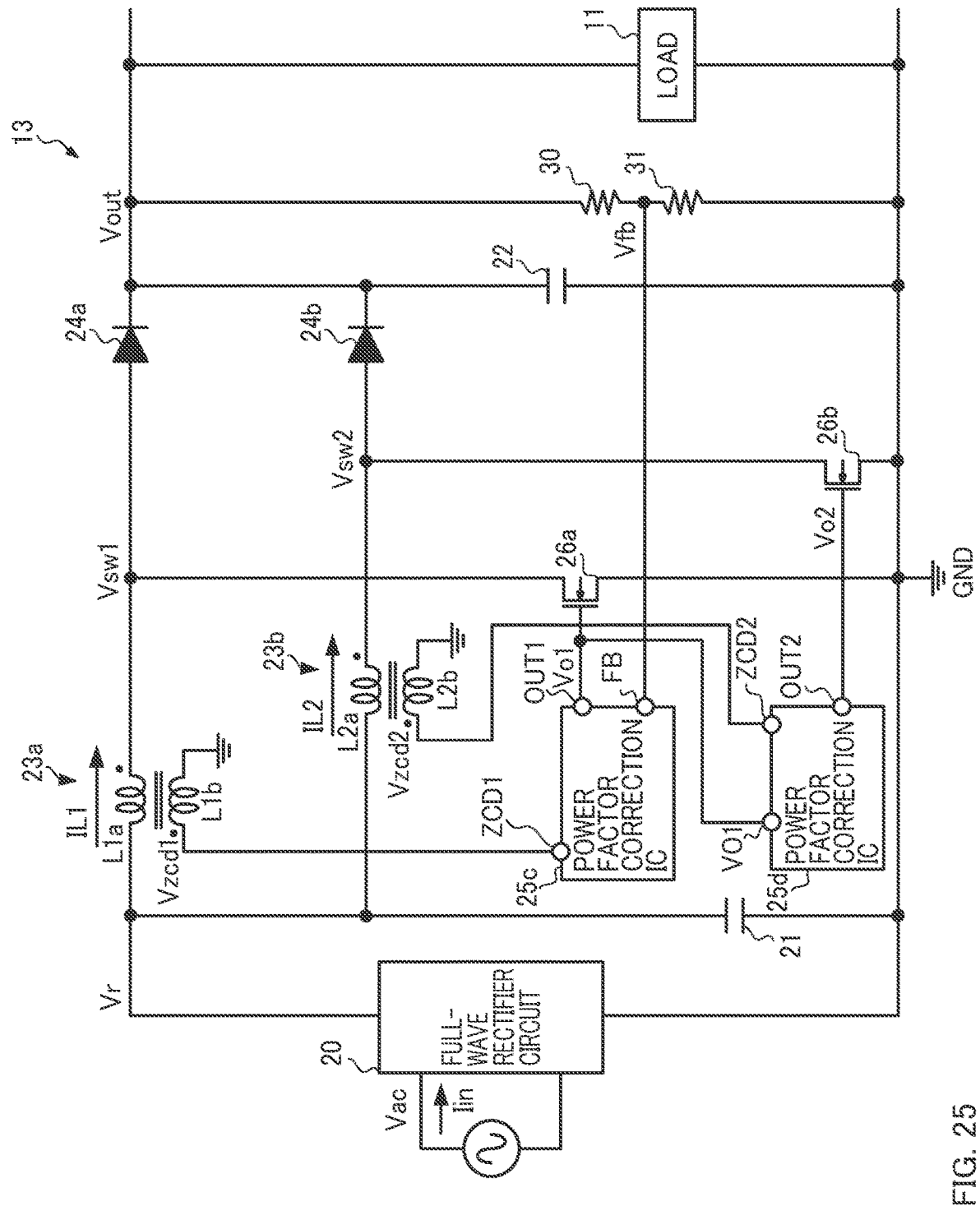
FIG. 25 is a diagram illustrating an example of an AC-DC converter 13.

FIG. 25 is a diagram illustrating an example of an AC-DC converter 13. It is assumed that two boost chopper circuits are controlled by the single power factor correction IC 25a in the AC-DC converter 10 or the single power factor correction IC 25b in the AC-DC converter 12, however, the AC-DC converter 13 may be controlled by two power factor correction ICs 25c and 25d as illustrated in FIG. 25.

In the AC-DC converter 13 of FIG. 25, the power factor correction IC 25c includes, for example, AD converters 40 and 42, a buffer circuit 44, and a switching control circuit 50. The power factor correction IC 25c has terminals ZCD1, OUT1, and FB that function as those in the power factor correction IC 25a. The power factor correction IC 25d includes an AD converter 41, a buffer circuit 45, and a switching control circuit 51. The power factor correction IC 25d includes terminals ZCD2, OUT2, and VO1. The terminals ZCD2 and OUT2 function as those in the power factor correction IC 25a. The voltage VO1 to control switching of the NMOS transistor 26a is applied to the terminal VO1.

The power factor correction IC 25d can obtain the command value V1 from the time period during which the voltage VO1 is high and obtain the signal Vc1 in accordance with the change in the voltage VO1, using a circuit (not illustrated). Note that the power factor correction IC 25c is not limited to the examples including the switching control circuit 50 described in an embodiment of the present disclosure, but may use an integrated circuit for a typical power factor correction circuit instead of the power factor correction IC 25c.

<<<Overview of AC-DC Converter 14>>>

Figure 26:
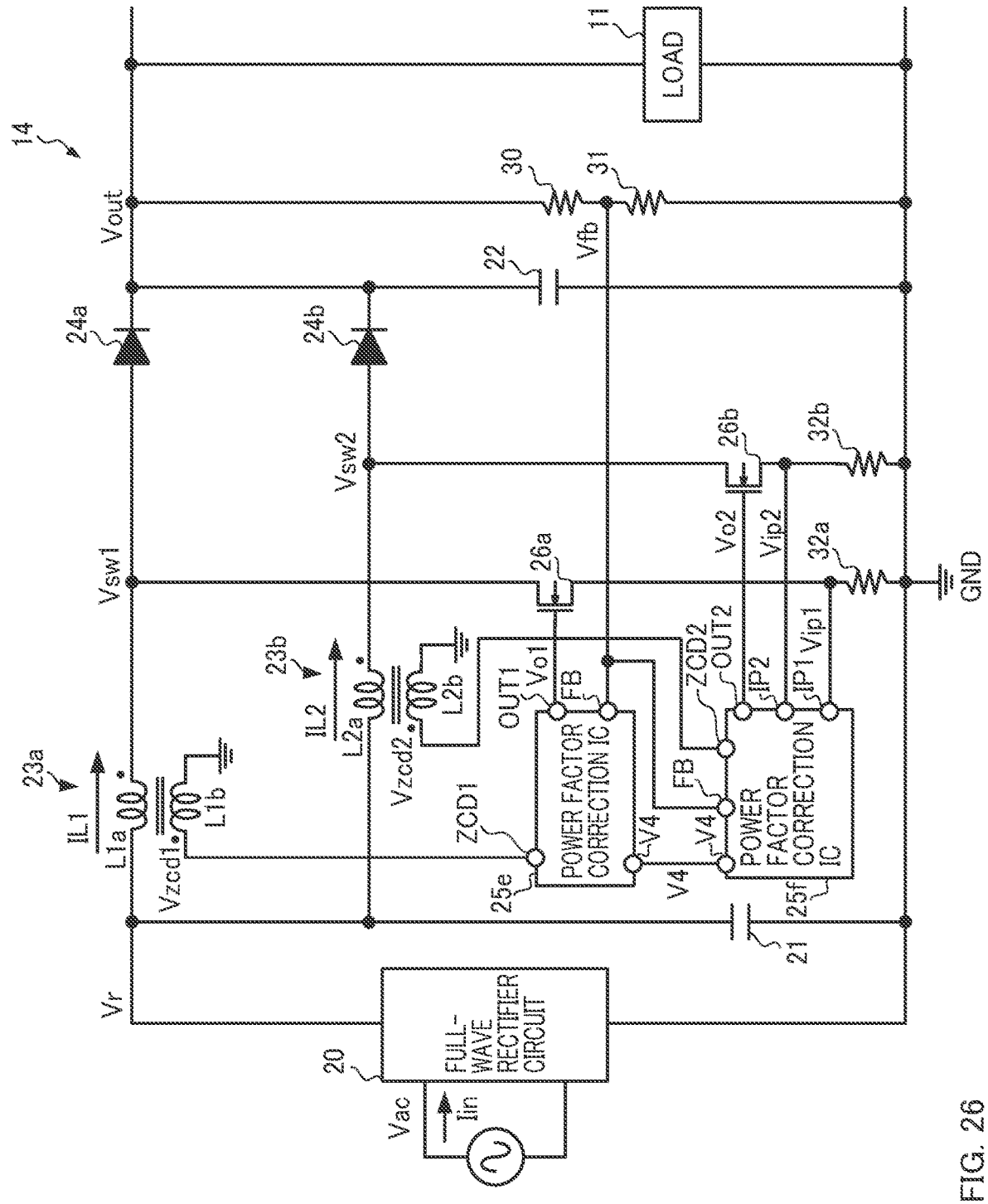
FIG. 26 is a diagram illustrating an example of an AC-DC converter 14.

FIG. 26 is a diagram illustrating an example of an AC-DC converter 14. As in the AC-DC converter 13, the AC-DC converter 14 is controlled by two power factor correction ICs 25e and 25f. In the AC-DC converter 14 of FIG. 26, the power factor correction IC 25e includes, for example, AD converters 40 and 42, a buffer circuit 44, and a switching control circuit 53. The power factor correction IC 25e has terminals ZCD1, OUT1, and FB. The terminals ZCD1, OUT1, and FB function as in the power factor correction IC 25b.

The power factor correction IC 25f includes AD converters 41, 42, 46, and 47, a buffer circuit 45, a control circuit 52, and a switching control circuit 54. The power factor correction IC 25f also has terminals ZCD2, OUT2, V4, IP1, IP2, and FB. The terminals ZCD2, OUT2, IP1, IP2, and FB function as in the power factor correction IC 25b. The command value V4 from the correction circuit 122 in FIG. 15 is outputted to the power factor correction IC 25e through the terminal V4.

The AD converters 46 and 47 and the control circuit 52 may be included in the power factor correction IC 25e together with the switching control circuit 53, or may be included in both of the power factor correction ICs 25e and 25f.

<<<Overview of AC-DC Converter 15>>>

Figure 27:
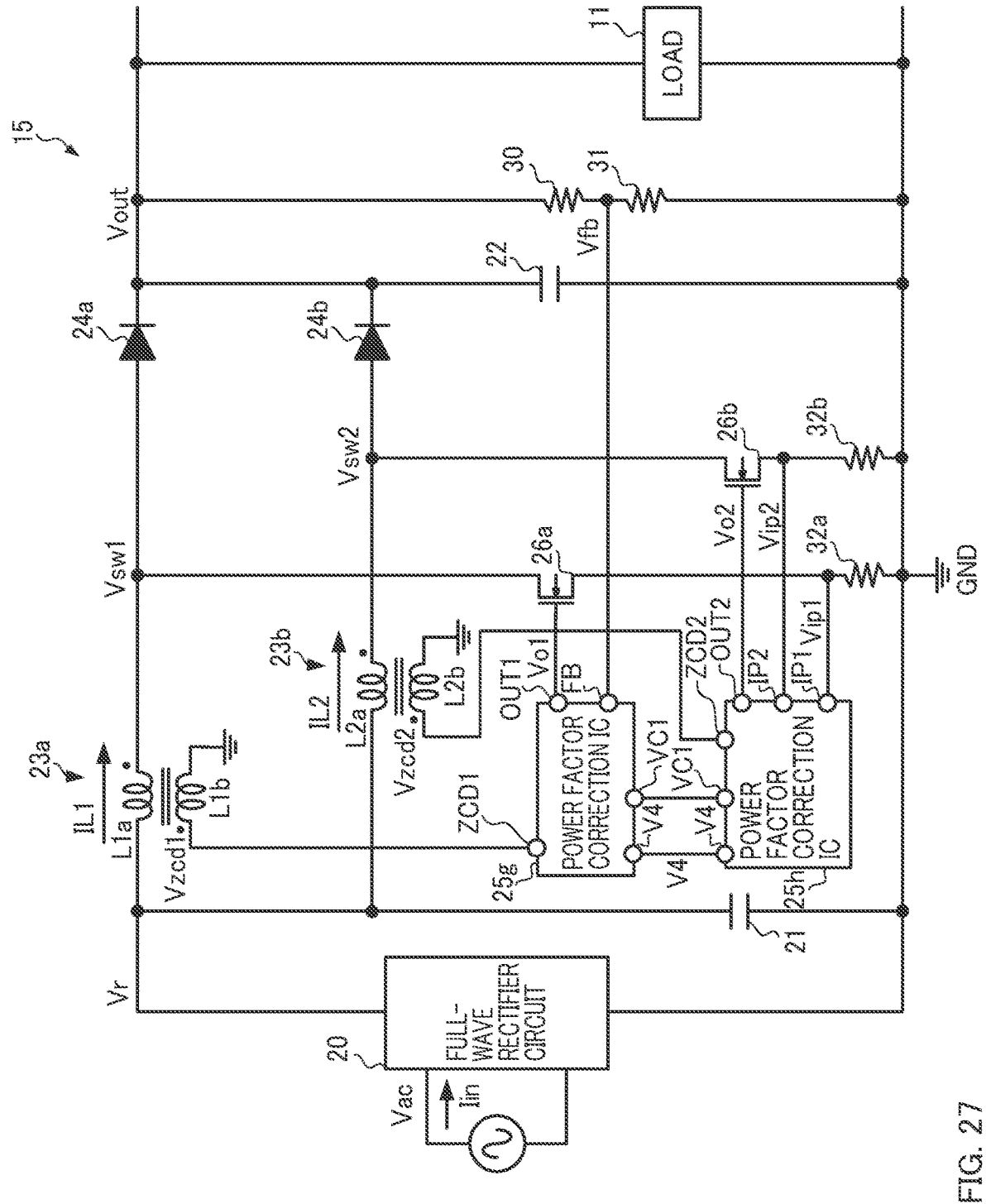
FIG. 27 is a diagram illustrating an example of an AC-DC converter 15.

FIG. 27 is a diagram illustrating an example of an AC-DC converter 15. As in the AC-DC converters 13 and 14, the AC-DC converter 15 is controlled by two power factor correction ICs 25g and 25h. In the AC-DC converter 15 of FIG. 27, the power factor correction IC 25g includes, for example, AD converters 40 and 42, a buffer circuit 44, and a switching control circuit 55. The power factor correction IC 25g also has terminals ZCD1, OUT1, FB, VC1, and V4. The terminals ZCD1, OUT1, and FB function as those in the power factor correction IC 25b. The signal Vc1 from the comparator circuit 60 is outputted to the power factor correction IC 25h through the terminal VC1.

The power factor correction IC 25h includes AD converters 41, 46, and 47, a buffer circuit 45, a control circuit 52, and a switching control circuit 56. The power factor correction IC 25h also has terminals ZCD2, OUT2, VC1, V4, IP1, and IP2. The terminals ZCD2, OUT2, IP1, and IP2 function as those in the power factor correction IC 25b. The command value V4 from the correction circuit 122 in FIG. 15 is outputted to the power factor correction IC 25g through the terminal V4.

The AD converters 46 and 47 and the control circuit 52 may be included in the power factor correction IC 25g together with the switching control circuit 55, or may be included in both of the power factor correction ICs 25g and 25h.

Although FIGS. 25 to 27 illustrate examples in which two power factor correction ICs control the AC-DC converter 13, 14, or 15, the switching control circuits and the control circuits described above may be implemented using discrete parts as appropriate with reference to the foregoing embodiments or may be implemented using three or more integrated circuits.

SUMMARY

The AC-DC converter 10 of an embodiment of the present disclosure has been described. The switching control circuit 51 includes, in order to implement a configuration that is the same as or similar to that of a so-called PLL circuit, the detection circuit 80, the error output circuit 81 (corresponding to a phase detection circuit), and the driving signal output circuit 82 (corresponding to a voltage-controlled oscillator). Specifically, the detection circuit 80 detects the switching period Ta of the NMOS transistor 26a and the time difference Tθ, in response to the signals Vc1 and Vc3 respectively indicating the ON timings of the NMOS transistors 26a and 26b. Then, the error output circuit 81 outputs the command value Vlpf, in response to the signal VR from the detection circuit 80. The subtractor circuit 110 subtracts the command value Vlpf from the command value V1 indicating the time period T1, which is the ON period of the NMOS transistor 26a, to thereby output a resultant as the command value V2 indicating the ON period of the NMOS transistor 26b. Then, the output circuit 101 outputs a driving signal Vq2 to turn on the NMOS transistor 26b, according to the command value V2. In this way, the power factor correction IC 25a implements a configuration that is the same as or similar to that of a so-called PLL circuit, maintains the ratio R of the time difference Tθ to the switching period Ta at a predetermined ratio, and implements an interleaved operation while following the change in the switching frequency of the NMOS transistor 26a. This makes it possible to provide a switching control circuit and a control circuit that enable an appropriate interleaved operation of a PFC circuit.

The detection circuit 80 is the RS flip-flop 90 configured to detect the time difference Tθ and the switching period Ta of the NMOS transistor 26a. This enables the detection circuit 80 to output the signal VR indicating the ratio R of the time difference Tθ to the switching period Ta, with a simple circuit.

The error output circuit 81 includes the subtractor circuit 92 and the low-pass filter 93. The subtractor circuit 92 and the low-pass filter 93 constitute an error amplifier circuit configured to amplify the error E2, to thereby output a resultant as the command value Vlpf. This enables the switching control circuit 51 to implement the interleaved operation while following the temporal change in the difference between the ratio R and the predetermined ratio (i.e., the error E2) and keeping the ratio R at the predetermined ratio.

The control circuit 52 includes the sample-and-hold circuits 120 and 121 and the correction circuit 122. The sample-and-hold circuits 120 and 121 detect the peak values of the inductor currents IL1 and IL2, respectively, to thereby output resultants as the signals Ip1 and Ip2. The correction circuit 122, when the signal Ip2 is larger than the signal Ip1, controls the driving signal output circuit 86 so as to reduce the time period T2. This enables the power factor correction IC 25b to cause the inductor currents IL1 and IL2 to have equal peak values.

The driving signal output circuit 86 includes the comparator circuit 100, the delay circuit 103, and the output circuit 104. The delay circuit 103 delays the timing at which the NMOS transistor 26b is turned on, according to the difference between the signals Ip1 and Ip2, to thereby output a resultant. This enables the switching control circuit 56 to cause the inductor currents IL1 and IL2 to have equal peak values while maintaining the interleaved operation.

The delay circuit 103 delays the timing at which the NMOS transistor 26b is turned on, according to the difference between the signals Ip1 and Ip2 and the resonant period of the inductor current IL2. This enables the driving signal output circuit 86 to output the driving signal Vq2 so as to perform a so-called bottom-skip operation.

The control circuit 52 includes the sample-and-hold circuits 120 and 121 and the correction circuit 122. The sample-and-hold circuits 120 and 121 detect the peak values of the inductor currents IL1 and IL2, respectively, to thereby output resultants as the signals Ip1 and Ip2. The correction circuit 122 corrects at least one of the time period T1 or the time period T2 so as to reduce the difference between the signals Ip1 and Ip2. This enables the control circuit 52 to cause the inductor currents IL1 and IL2 to have equal peak values.

The correction circuit 122 corrects the time period T1 so as to be reduced, when the signal Ip1 is larger than the signal Ip2, and corrects the time period T2 so as to be reduced, when the signal Ip2 is larger than the signal Ip1. This enables the correction circuit 122 to correct the larger one of the signals Ip1 and Ip2 such that the signals Ip1 and Ip2 will be equal.

The switching control circuit 53 includes the comparator circuit 60 and the output circuit 62. When the signal Ip1 is larger than the signal Ip2, the output circuit 62 outputs a driving signal Vq1 to turn off the NMOS transistor 26a, in response to the time period TA having elapsed since the NMOS transistor 26a is turned on. This enables the switching control circuit 53 to cause the peak value of the inductor current IL1 to be equal to the peak value of the inductor current IL2.

The switching control circuit 55 includes the delay circuit 63. The output circuit 64 outputs a driving signal Vq1 to turn on the NMOS transistor 26a, in response to the signal Vc5 from the delay circuit 63. This enables the switching control circuit 55 to cause the inductor currents IL1 and IL2 to have equal peak values while maintaining the interleaved operation.

The delay circuit 63 delays the signal Vc1, based on the resonant period of the inductor current IL1 and the time period TA, to thereby output a resultant as the signal Vc5. This enables the output circuit 64 to output the driving signal Vq1 so as to perform a so-called bottom-skip operation.

The present disclosure is directed to provision of a switching control circuit and a control circuit that enable an appropriate interleaved operation of a PFC circuit.

According to the present disclosure, it is possible to provide a switching control circuit and a control circuit that enable an appropriate interleaved operation of a PFC circuit.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A switching control circuit for a power supply circuit configured to generate an output voltage at a target level from an alternating current (AC) voltage inputted thereto, the power supply circuit including
first and second inductors configured to receive a voltage according to the AC voltage, a first transistor configured to control a first inductor current flowing through the first inductor, the first transistor being configured to be turned on, after the first inductor current reaches a first predetermined value, and be turned off, in response to a first time period according to the output voltage having elapsed, and a second transistor configured to control a second inductor current flowing through the second inductor, the switching control circuit being configured to control switching of the second transistor, the switching control circuit comprising:

a detection circuit configured to detect a switching period of the first transistor, and a time difference between a first timing, at which the first inductor current reaches the first predetermined value, and a second timing, at which the second inductor current reaches a second predetermined value;

an error output circuit configured to output an error between a predetermined ratio and a ratio of the time difference to the switching period, the time difference and switching period being based on a result of detection of the detection circuit; and a driving signal output circuit configured to output a driving signal to turn on the second transistor, after the second inductor current reaches the second predetermined value, and output the driving signal to turn off the second transistor, in response to a second time period, which is determined according to the first time period and the error, having elapsed.

2. The switching control circuit according to claim 1, wherein the detection circuit is a signal output circuit configured to output a signal that is at a first level at the first timing and at a second level at the second timing, the signal output circuit being configured to detect the time difference in a time period during which the signal is at the first level, and detect the switching period each time the signal reaches the first level.

3. The switching control circuit according to claim 2, wherein the error output circuit includes a subtractor circuit configured to output a difference between the level of the signal and a reference level indicating the predetermined ratio, and an integrator circuit configured to integrate the difference, to thereby output a result thereof as the error.

4. The switching control circuit according to claim 1, further comprising:

a first current detection circuit configured to detect a first peak value, which is a peak value of the first inductor current at a time when the first transistor is turned off;

a second current detection circuit configured to detect a second peak value, which is a peak value of the second inductor current at a time when the second transistor is turned off; and a correction circuit configured to control the driving signal output circuit so as to reduce the second time period, when the second peak value is larger than the first peak value.

5. The switching control circuit according to claim 4, wherein the driving signal output circuit includes a timing detection circuit configured to, in response to the second inductor current reaching the second predetermined value, detect a third timing at which the second transistor is turned on, a delay circuit configured to delay the third timing, according to a difference between the second peak value and the first peak value, to thereby output the delayed third timing, and an output circuit configured to output the driving signal to turn on the second transistor, based on the delayed third timing, and output the driving signal to turn off the second transistor, in response to a third time period shorter than the second time period having elapsed.

6. The switching control circuit according to claim 5, wherein the delay circuit delays the third timing, based on the difference between the second peak value and the first peak value and a resonant period of the second inductor current.

7. A power supply circuit configured to generate an output voltage at a target level from an alternating current (AC) voltage inputted thereto, the power supply circuit comprising:

first and second inductors configured to receive a voltage according to the AC voltage;

a first transistor configured to control a first inductor current flowing through the first inductor;

a second transistor configured to control a second inductor current flowing through the second inductor; and a switching control circuit configured to control switching of the second transistor, wherein the first transistor is configured to be turned on, after the first inductor current reaches a first predetermined value, and be turned off in response to a first time period according to the output voltage having elapsed, and the switching control circuit includes a detection circuit configured to detect a switching period of the first transistor, and a time difference between a first timing, at which the first inductor current reaches the first predetermined value, and a second timing, at which the second inductor current reaches a second predetermined value, an error output circuit configured to output an error between a predetermined ratio and a ratio of the time difference to the switching period, the time difference and switching period being based on a result of detection of the detection circuit, and a driving signal output circuit configured to output a driving signal to turn on the second transistor, after the second inductor current reaches the second predetermined value, and turn off the second transistor, in response to a second time period, which is determined according to the first time period and the error, having elapsed.

* * * * *